United States Patent
Mori

(10) Patent No.: US 10,289,356 B2
(45) Date of Patent: May 14, 2019

(54) INFORMATION PROCESSING APPARATUS, INFORMATION PROCESSING SYSTEM, METHOD FOR PROCESSING INFORMATION, AND PROGRAM

(71) Applicant: Keisuke Mori, Tokyo (JP)

(72) Inventor: Keisuke Mori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/621,376

(22) Filed: Jun. 13, 2017

(65) Prior Publication Data

US 2017/0371598 A1  Dec. 28, 2017

(30) Foreign Application Priority Data

Jun. 28, 2016 (JP) ................. 2016-127215

(51) Int. Cl.
  *G06F 3/12* (2006.01)

(52) U.S. Cl.
  CPC ............ *G06F 3/121* (2013.01); *G06F 3/1261* (2013.01); *G06F 3/1267* (2013.01); *G06F 3/1288* (2013.01); *G06F 3/1291* (2013.01)

(58) Field of Classification Search
None
See application file for complete search history.

(56) References Cited

U.S. PATENT DOCUMENTS

| | | | |
|---|---|---|---|
| 9,110,610 B2 | 8/2015 | Mori | |
| 9,292,778 B2 | 3/2016 | Mori | |
| 2005/0188112 A1* | 8/2005 | Desai | H04L 47/10 709/247 |
| 2005/0238255 A1* | 10/2005 | Niwa | H04N 21/23436 382/305 |
| 2007/0024897 A1* | 2/2007 | Moore | G06F 3/1208 358/1.15 |
| 2008/0037062 A1* | 2/2008 | Omino | G06F 21/305 358/1.15 |
| 2012/0069394 A1* | 3/2012 | Ono | G06F 3/121 358/1.15 |
| 2014/0314139 A1* | 10/2014 | Xia | H04N 19/115 375/240.02 |
| 2015/0116764 A1 | 4/2015 | Mori | |
| 2016/0134723 A1* | 5/2016 | Gupta | H04L 67/2828 709/247 |
| 2016/0277631 A1 | 9/2016 | Mori | |

FOREIGN PATENT DOCUMENTS

JP 2015-088019 5/2015

\* cited by examiner

*Primary Examiner* — Moustapha Diaby
(74) *Attorney, Agent, or Firm* — IPUSA, PLLC

(57) ABSTRACT

An information processing apparatus includes a first memory unit configured to store data, which is output target data to be output to an apparatus, a compression unit configured to generate compression data formed by compressing the data, and a sending unit configured to send the compression data corresponding to the data in response to a data acquisition request to acquire the data from the apparatus.

20 Claims, 18 Drawing Sheets

FIG.8

| ITEM NAME | VALUE (EXAMPLE) |
|---|---|
| TIME AND DATE | 2016/06/07 ··· |
| DOCUMENT ID | 100 |
| USER NAME | User_A |
| JOB NAME | aaa.txt |
| STORAGE DESTINATION ID | 1 |
| STORAGE DESTINATION PATH NAME | C:¥data |
| LANGUAGE | PCL |
| PAGE NUMBER | 10 |
| SIDE SETUP | 1 (SIMPLEX), 2 (DUPLEX) |
| COLOR INFORMATION | 1 (MONOCHROME), 2 (COLOR) |
| CIRCULATION | 5 |

FIG.9

| ITEM NAME | VALUE (EXAMPLE) |
|---|---|
| STORAGE DESTINATION ID | 1 |
| IP ADDRESS | 192.168.10.11 |
| HOST NAME | ServerA |
| PORT NUMBER | 8080 |
| PORT NUMBER (https) | 8443 |
| KIND | 1 or 2 |

FIG.13

| ITEM NAME | VALUE (EXAMPLE) |
|---|---|
| NECESSITY OF COMPRESSION | True (NECESSARY), False (UNNECESSARY) |
| COMPRESSION LEVEL | 0-10 |

COMPRESSION SETUP

NECESSITY OF COMPRESSION:  ● ON  ○ OFF

COMPRESSION LEVEL:  6

CANCEL    SETUP

INFORMATION PROCESSING APPARATUS, INFORMATION PROCESSING SYSTEM, METHOD FOR PROCESSING INFORMATION, AND PROGRAM

CROSS-REFERENCE TO RELATED APPLICATIONS

The present application claims priority under 35 U.S.C. § 119 to Japanese Patent Application No. 2016-127215 filed Jun. 28, 2016, the contents of which are incorporated herein by reference in their entirety.

BACKGROUND OF THE INVENTION

Field of the Invention

The present invention relates to an information processing apparatus, an information processing system, a method for processing information, and a program.

Description of the Related Art

There is a method of printing referred to as pull-printing. In pull-printing, when a user inputs a print instruction of printing document data using a personal computer (PC), the print data of the document data are stored in the PC or a predetermined server. Thereafter, the image forming apparatus acquires (pulls) the print data stored in the PC or the server in response to an operation conducted by an operator, and executes a print job. In the pull print, because the print job is executed when the user exists in the vicinity of the image forming apparatus. Therefore, it is possible to prevent a paper having secret information printed on it from being left or seen by another person. Further, in the pull print, print jobs for the same print data can be executed from any one of multiple image forming apparatuses which refer to the same server as in Japanese Unexamined Patent Application Publication No. 2015-088019.

SUMMARY OF THE INVENTION

An information processing apparatus including a first memory unit configured to store data, which is output target data to be output to an apparatus, a compression unit configured to generate compression data formed by compressing the data, and a sending unit configured to send the compression data corresponding to the data in response to a data acquisition request to acquire the data from the apparatus.

BRIEF DESCRIPTION OF THE DRAWINGS

FIG. 8 illustrates an example of a structure of a job information memory unit;

FIG. 9 illustrates an example of a structure of a storage destination information memory unit;

FIG. 13 illustrates an example of a structure of a compression setup memory unit;

FIG. 14 is an example of displaying a compression setup screen;

DESCRIPTION OF THE EMBODIMENTS

In a circumstance where the size of the print data is large or the bandwidth of the network is narrow, there is a problem that the network load increases due to a transfer of print data between a personal computer (PC) or a server and an image forming apparatus.

An embodiment of the present invention is provided in consideration of the above points. The object of the embodiment of the present invention is to decrease the network load caused by a transfer of data stored as output target data to be output to an apparatus.

Figure 1:
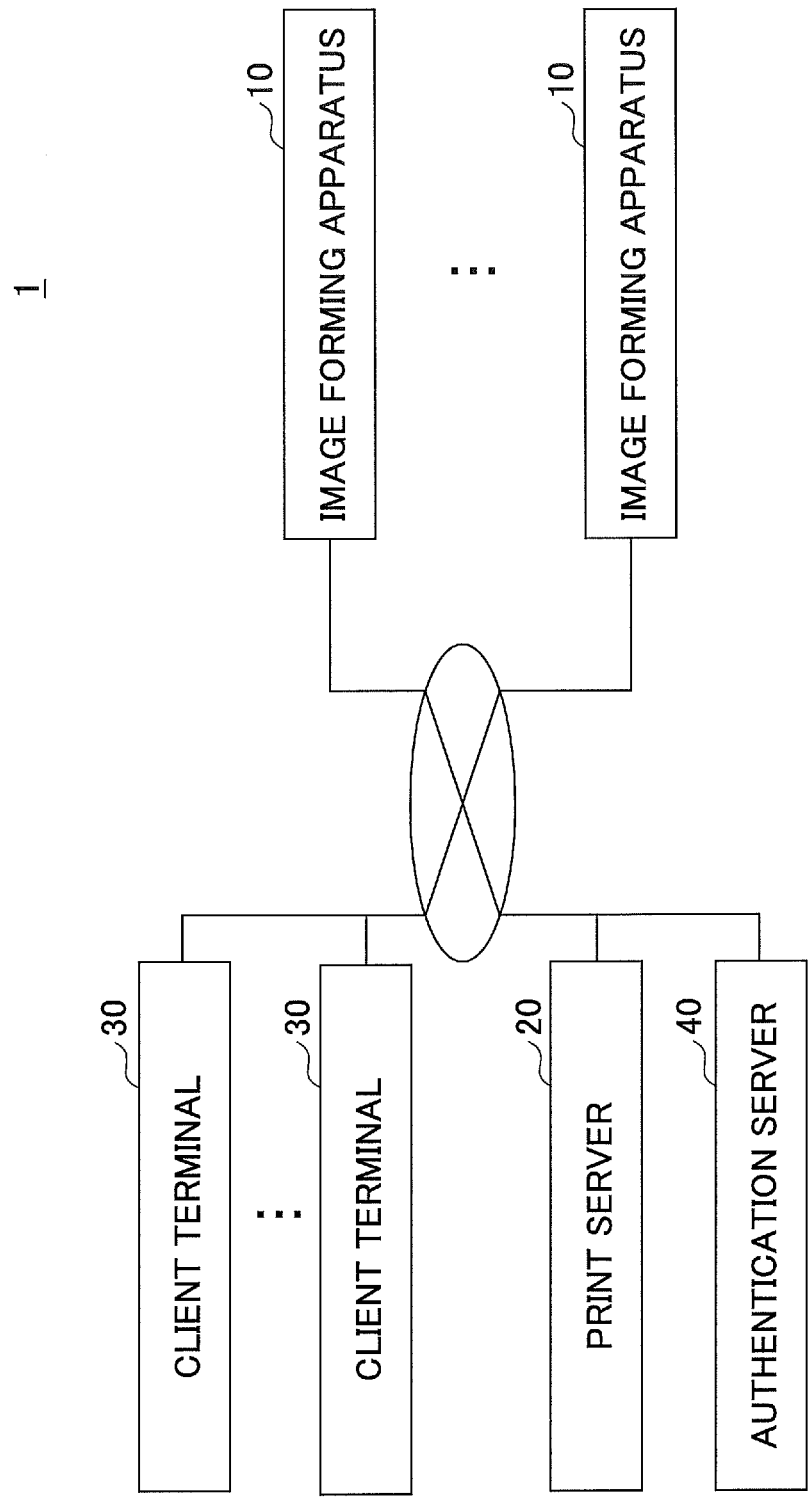
FIG. 1 illustrates an example of a structure of a print system according to a first embodiment of the present invention.

Hereinafter, an embodiment of the present invention is described based on figures. FIG. 1 illustrates an example of a structure of a print system according to a first embodiment of the present invention. In a print system 1 illustrated in FIG. 1, at least one client terminal 30, a print server 20, an authentication server 40, an at least one image forming apparatus 10, and so on are coupled one another through a network such as local area network (LAN) or the Internet.

The at least one client terminal 30 generates job information and print data that is designated by a user as a print object such as document data. In the first embodiment, the print data and the job information are generated with respect to one print job. The print data conforms to an output form for the image forming apparatus 10. The job information is bibliographic information of print data (a print job). The generated job information is sent to the print server 20.

Further, the generated print data is stored in the client terminal 30 or the print server 20. A storage destination of the print data of whether the client terminal 30 or the print server 20 is determined in accordance with a designation by a user at a time of a print instruction, for example. A personal computer (PC), a smartphone, a tablet terminal, or the like may be used as the client terminal 30.

The print server 20 is at least one computer storing the job information, the print data, or the like, which are sent from the client terminal 30. The print server 20 returns a view (hereinafter, referred to as a "job list") of the stored job information to the image forming apparatus 10 in response to a request from the image forming apparatus 10.

The authentication server 40 is at least one computer executing an authentication process for an operation of the image forming apparatus 10. The user successfully authenticated by the authentication server 40 can use the image forming apparatus 10.

The image forming apparatus 10 is, for example, a printer or a multifunction peripheral. The image forming apparatus 10 requests the print server 20 to send a job list in response to the operation of the user. The image forming apparatus 10 acquires, from the print server 20 and the client terminal, the print data corresponding to the job information selected by the user from the job list returned from the print server 20. Here, the print data corresponding to the job information is the print data related to the same print job as the job information.

Figure 2:
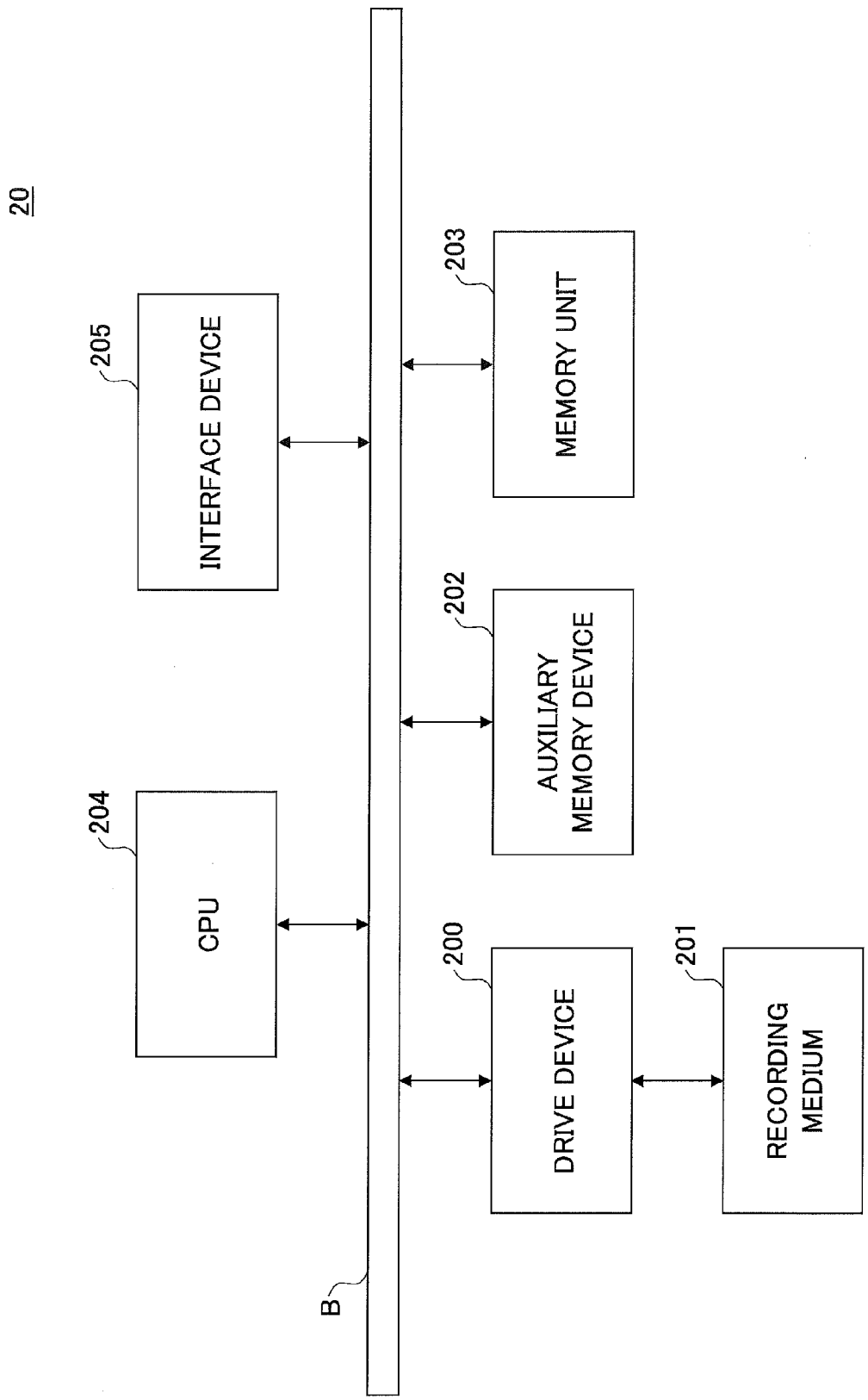
FIG. 2 illustrates an example of a hardware structure of a print server according to the first embodiment of the present invention.

FIG. 2 illustrates an example of a hardware structure of the print server according to the first embodiment of the present invention. The print server 20 illustrated in FIG. 2 includes a drive device 200, an auxiliary memory device 202, a memory device 203, a CPU 204, and an interface device 205, or the like, which are mutually coupled by a bus B.

A program substantializing processes in the print server 20 is supplied by a recording medium 101 such as a CD-ROM. When the recording medium 101 having the program recorded in it is set in the drive device 200, the program is installed on the auxiliary memory device 202 through the drive device 200 from the recording medium 101. However, the program needs not to be always installed from the recording medium 101 and may be downloaded from another computer via the network. The auxiliary memory device 202 stores necessary files, data and so on in addition to the installed program.

The memory device 203 reads out the program from the auxiliary memory device 202 when the program is instructed to be invoked and stores the read program into the memory device 203. The CPU 204 performs a function related to the print server 20 in conformity with the program stored in the memory device 203. The interface device 205 is used as an interface for connecting to the network.

The client terminal 30 and the authentication server 40 may have a hardware structure illustrated in FIG. 1.

Figure 3:
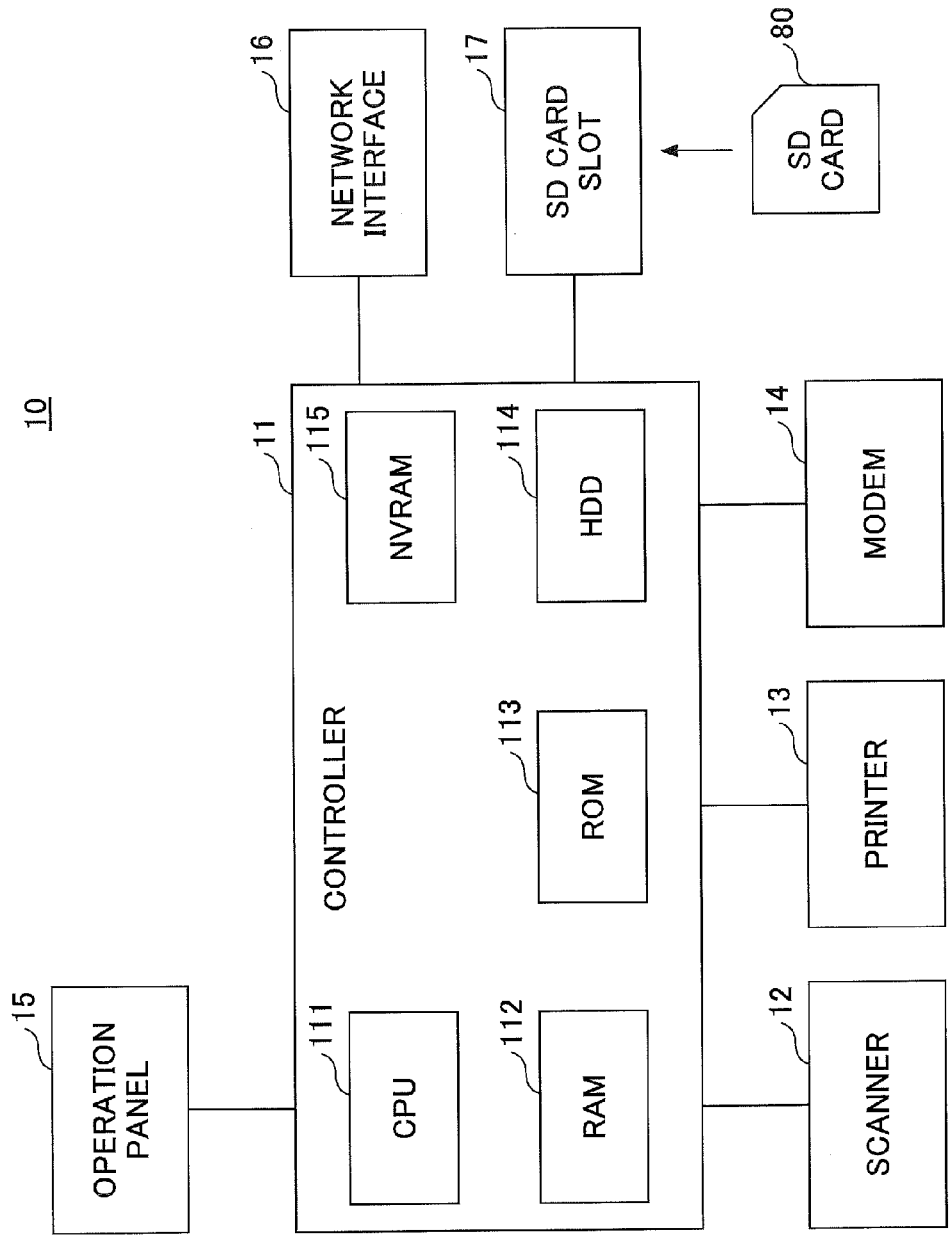
FIG. 3 illustrates an example of a hardware structure of an image forming apparatus of the first embodiment of the present invention.

FIG. 3 illustrates an example of a hardware structure of the image forming apparatus of the first embodiment. Referring to FIG. 3, the image forming apparatus 10 includes hardware such as a controller 11, a scanner 12, a printer 13, a modem 14, an operation panel 15, a network interface 16, and an SD card slot 17.

The controller 11 includes a CPU 111, a RAM 112, a ROM 113, an HDD 114, an NVRAM 115, and so on. Various programs and data used by the programs are stored in the ROM 113. The RAM 112 is used as a memory area for loading the programs, a work area for the loaded programs, or the like. The CPU 111 implements various functions by processing the program loaded into the RAM 112. The HDD 114 stores the programs, various data used by the programs, or the like. The NVRAM 115 stores various kinds of setup information or the like.

The scanner 12 is hardware (an image reading unit) for reading image data from an original (an original manuscript). The printer 13 is hardware (a printing unit) for printing print data on a print paper. The modem 14 is hardware for connecting the image forming apparatus 10 to a telecommunication line and is used for sending and receiving the image data with fax communications. The operation panel 15 is hardware provided with an input unit for receiving an input from the user such as a button, a display unit such as a liquid crystal panel, or the like. The liquid crystal panel may have a touch panel function. In this case, the liquid crystal panel may also have a function of an input unit. The network interface 16 is hardware for connecting the image forming apparatus 10 to a wired or wireless network such as LAN. The SD card slot 17 is used to read a program recorded in an SD card 80. Said differently, not only the program stored in the ROM 113 but also the program stored in the SD card 80 may be loaded into the RAM 112 and executed by the image forming apparatus 10. The SD card 80 may be substituted by another recording medium such as a compact disc read only memory (CD-ROM) and a universal serial bus (USB) memory. The type of the recording medium substituting for the SD card 80 is not specifically limited. In this case, the SD card slot 17 may be substituted by hardware depending on the type of the recording media.

Figure 4:
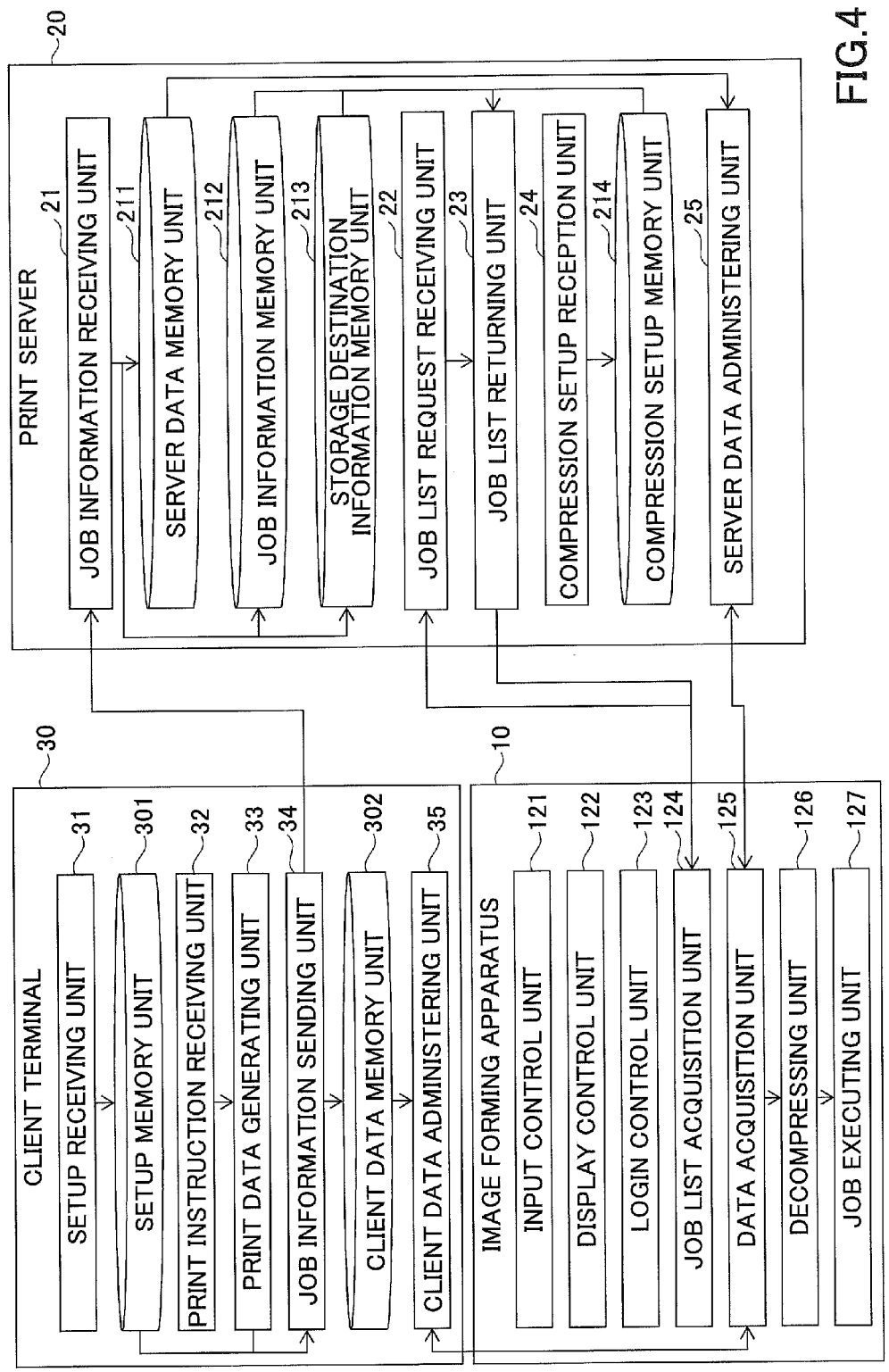
FIG. 4 illustrates an example of a functional structure of a print system according to the first embodiment of the present invention.

FIG. 4 illustrates an example of a structure of a print system according to the first embodiment of the present invention. Referring to FIG. 4, the client terminal 30 includes a setup receiving unit 31, a print instruction receiving unit 32, a print data generating unit 33, a job information sending unit 34, a client data administering unit 35, and so on. The print data generating unit 33, the job information sending unit 34, the client data administering unit 35, and so on are implemented when the at least one program installed in the client terminal 30 is executed by the CPU of the client terminal 30. The client terminal 30 further includes a setup memory unit 301, a client data memory unit 302, and so on. The setup memory unit 301, the client data memory unit 302, and so on, can be substantialized by the auxiliary memory device or the like of the client terminal 30.

The setup receiving unit 31 receives an input of setup information enabling the print system 1 to be used from the user. The setup receiving unit 31 displays a setup screen 510 illustrated in, for example, FIG. 5 and receives setup information through the setup screen 510.

Figure 5:
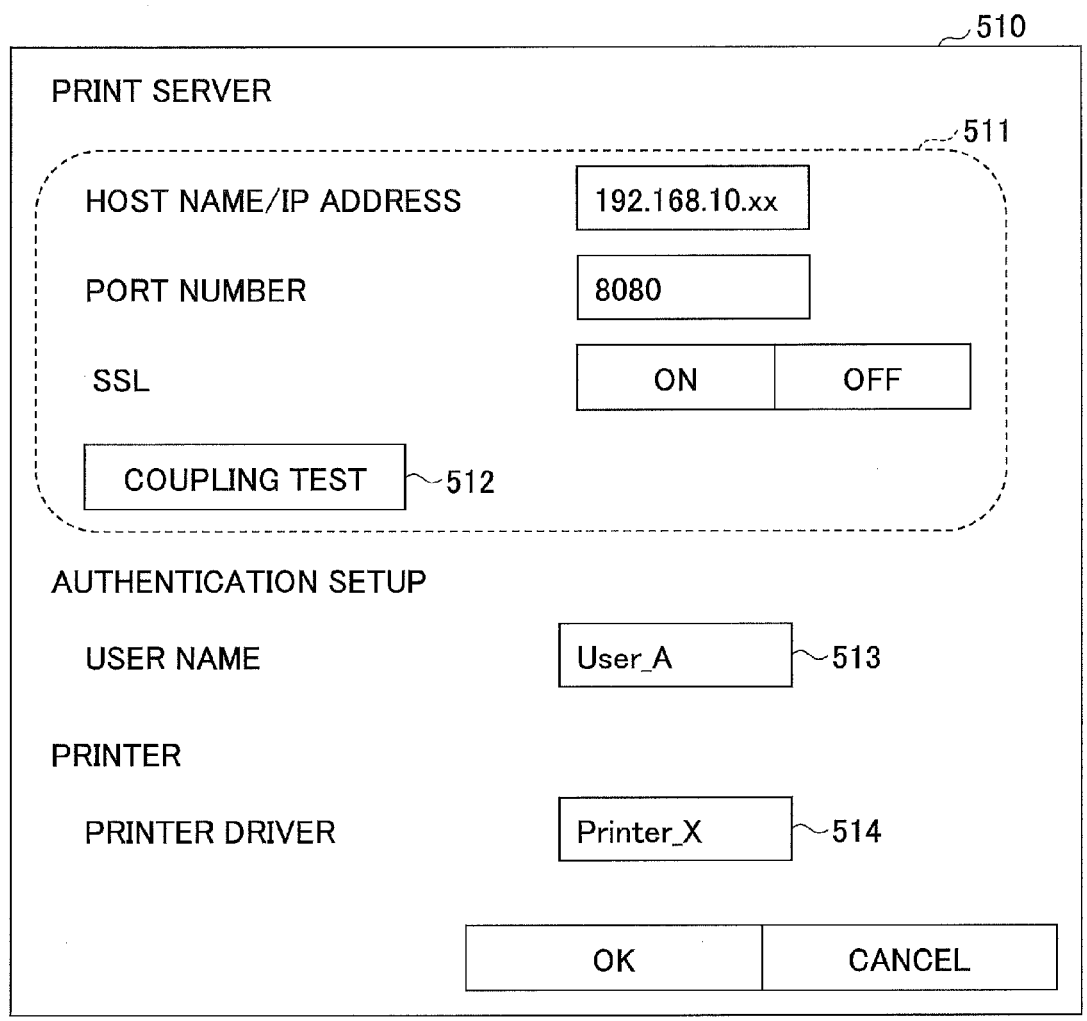
FIG. 5 illustrates an example of a setup screen in a client terminal.

FIG. 5 illustrates an example of the setup screen in a client terminal. Referring to FIG. 5, the setup screen 510 includes a server setup area 511, a user name setup area 513, and a printer driver setup area 514.

In the server setup area 511, a host name or an Internet protocol (IP) address of the print server 20, a port number, and the necessity of secure socket layer (SSL) communication can be set up. After these setups, a button 512 of a coupling test is pushed. Then, the setup receiving unit 31 tries a connection of communication with the print server 20 in accordance with the setup content.

In the user name setup area 513, a user name included in the job information is set up. The user name is used to identify a print job for each user.

In the printer driver setup area 514, a printer driver used to generate the print data is selected.

The setup information input onto the setup screen 510 is stored in the setup memory unit 301.

The print instruction receiving unit 32 receives a print instruction for document data stored in the client terminal 30, document data being edited by the client terminal 30, or the like. The print instruction designates a storage destination of the print data that is generated in relation to the document data.

The print data generating unit 33 generates the print data and the job information in relation to the document data designated as the print object.

The job information sending unit 34 sends the job information generated by the print data generating unit 33 to the print server 20 related to the setup information stored in the setup memory unit 301. In a case where the print server 20 is designated as the storage destination of the print data, the job information sending unit 34 sends the print data to the print server 20. In a case where the client terminal 30 is designated as the storage destination of the print data, the job information sending unit 34 sends the print data to the client data memory unit 302.

The client data administering unit 35 acquires print data from the client data memory unit 302 in response to an acquisition request to acquire the print data from the image forming apparatus 10. The client data administering unit 35 sends the acquired print data to the image forming apparatus 10, which is the sending source of the acquisition request.

The print server 20 includes a job information receiving unit 21, a job list request receiving unit 22, a job list returning unit 23, a compression setup reception unit 24, a server data administering unit 25, and so on. The job information receiving unit 21, the job list request receiving unit 22, the job list returning unit 23, the compression setup reception unit 24, the server data administering unit 25, and so on are substantialized when one or more programs installed in the print server 20 causes the CPU 204 to execute a process. The print server 20 further includes a server data memory unit 211, a job information memory unit 212, a storage destination information memory unit 213, a compression setup memory unit 214, and so on. The server data memory unit 211, the job information memory unit 212, the storage destination information memory unit 213, the compression setup memory unit 214, and so on can be substantialized by an auxiliary memory device 202 or the like. Alternatively, the server data memory unit 211, the job information memory unit 212, the storage destination information memory unit 213, the compression setup memory unit 214, and so on may be substantialized by a memory coupled to the print server through the network.

The job information receiving unit 21 receives the job information sent from the client terminal 30. The job information receiving unit 21 stores the received job information into the job information memory unit 212. In a case where the print data is received from the t client terminal, the job information receiving unit 21 stores the print data in the server data memory unit 211 while associating the print data with the job information. Further, the job information receiving unit 21 stores information related to the storage destination of the print data in the storage destination information memory unit 213.

The job list request receiving unit 22 receives the acquisition request to acquire the job list related to the login user of the image forming apparatus 10 from the image forming apparatus 10. The job list returning unit 23 acquires the job information including the user name of the login user of the image forming apparatus 10 from among the job information stored in the job information memory unit 212, and returns the job list formed by the acquired job information to the image forming apparatus 10.

The compression setup reception unit 24 receives an input of setup information (hereinafter, referred to as "compression setup information") related to the compression of the print data stored in the server data memory unit 211 from the user. The compression setup reception unit 24 stores the input compression setup information in the compression setup memory unit 214.

The server data administering unit 25 acquires the print data from the server data memory unit 211 in response to the acquisition request to acquire the print data related to the job information selected from among the job list in the image forming apparatus 10. The server data administering unit 25 sends the acquired print data to the image forming apparatus 10, which is the sending source of the acquisition request. The server data administering unit 25 compresses the print data in accordance with compression setup information stored in the compression setup memory unit 214 when the print data is returned.

The image forming apparatus 10 includes an input control unit 121, a display control unit 122, a login control unit 123, a job list acquisition unit 124, a data acquisition unit 125, a decompressing unit 126, a job executing unit 127, and so on. These units are substantialized when one or more programs installed in the image forming apparatus 10 are executed by the CPU 111.

The input control unit 121 interprets a user's instruction input through, for example, the operation panel 15. The display control unit 122 causes information generated in a progress of executed processes executed by the image forming apparatus 10 to be displayed on the operation panel 15. The login control unit 123 controls the login process performed by the user to the image forming apparatus 10.

The job list acquisition unit 124 acquires the job list related to the login user from the print server 20. The data acquisition unit 125 acquires the print data related to the job information selected by the user from among the job list displayed on the operation panel 15 from the client terminal 30 or the print server 20.

The decompressing unit 126 decompresses the print data in a case where the print data acquired by the data acquisition unit 125 is compressed.

The job executing unit 127 controls printing of the print data acquired by the data acquisition unit 125 or printing of the print data decompressed by the decompressing unit 126.

Figure 6:
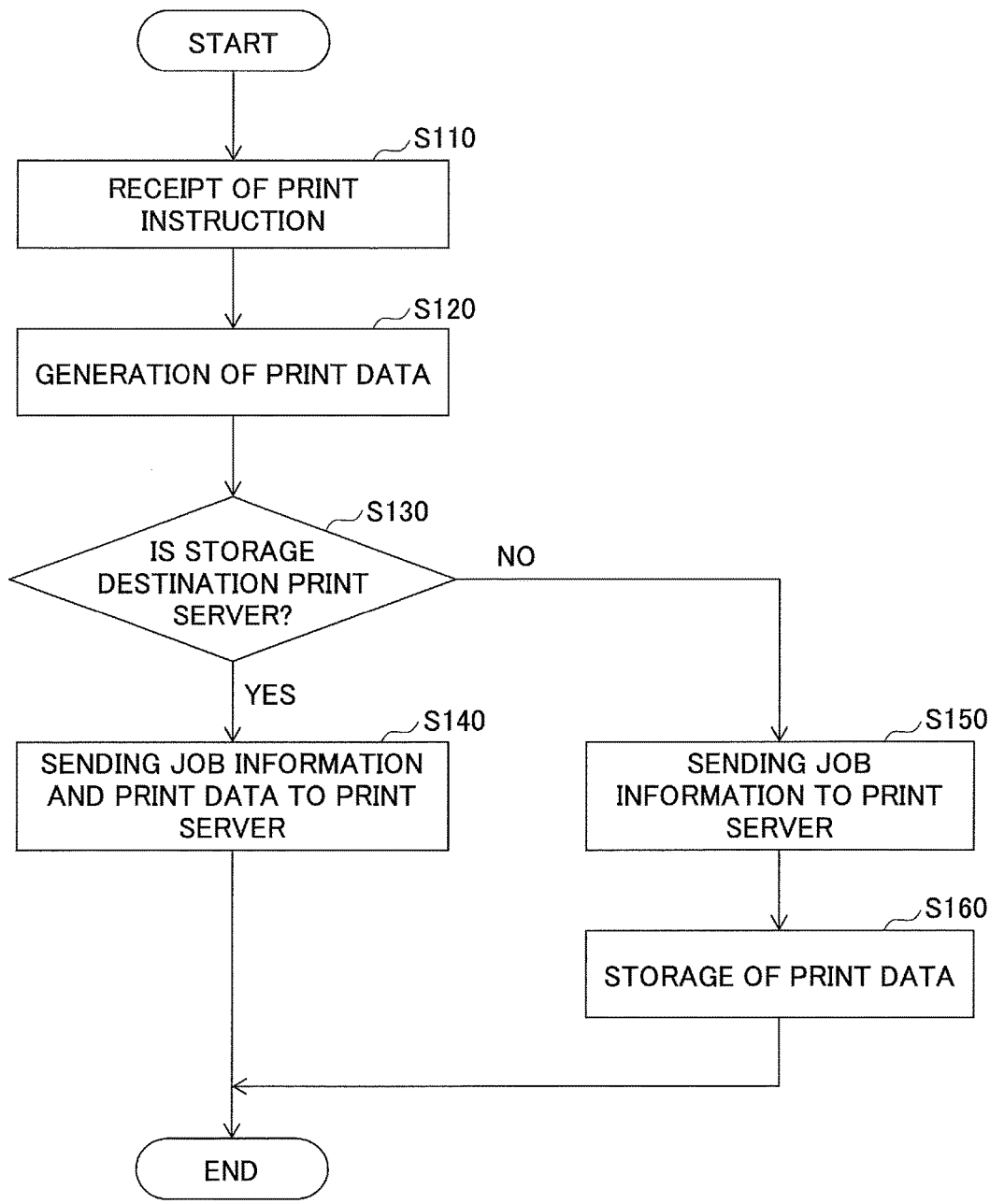
FIG. 6 is a flowchart illustrating an example of a procedure executed by a client terminal in response to a print instruction in the first embodiment.

Hereinafter, the procedure performed by the print system 1 is described. FIG. 6 is a flowchart illustrating an example of a procedure executed by the client terminal in response to the print instruction in the first embodiment.

In step S110, the print instruction receiving unit 32 receives a print instruction from a user. In the print instruction, the print object of the document data, the storage destination of the document data, and so on are designated. The storage destination of the print data may be received through a screen for receiving a setup of, for example, print attributes (print conditions).

Subsequently, the print data generating unit 33 generates the print data and the job information for the document data designated as the print object (step S120).

Subsequently, the job information sending unit 34 determines whether the storage destination of the print data is the print server 20 (step S130). The storage destination of the print data is the print server 20 (YES in step S203), the job information sending unit 34 sends the job information and the print data to the print server 20 (step S140). The print server 20 that is the sending destination of the job information or the like is specified by the setup information stored in the setup memory unit 301.

Meanwhile, in a case where the storage destination of the print data is the client terminal 330 (NO in step S130), the job information sending unit 34 sends the job information to the print server 20 (step S150). Subsequently, the job information sending unit 34 stores the print data into the client data memory unit 302 (step S160).

Figure 7:
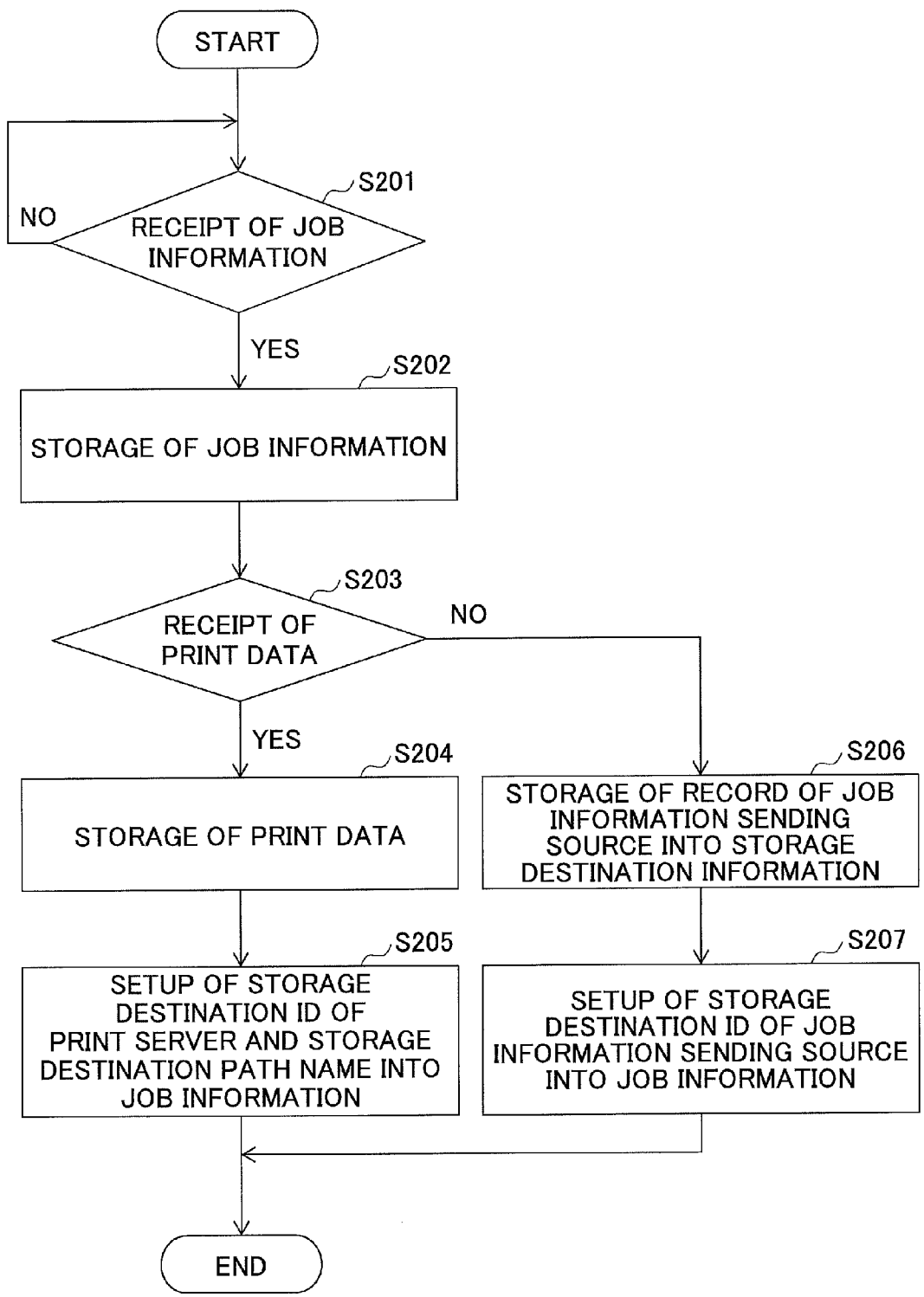
FIG. 7 is a flowchart of explaining an example of the procedure executed by a print server in response to a receipt of job information in the first embodiment.

FIG. 7 is a flowchart of explaining an example of the procedure executed by the print server in response to a receipt of the job information in the first embodiment.

When the job information receiving unit 21 receives the job information sent from the client terminal 30 (YES in step S201), the job information receiving unit 21 generates a new record (hereinafter, referred to as a "target job record") in the job information memory unit 212 and causes the job information to be stored in the target job records.

FIG. 8 illustrates an example of the structure of the job information memory unit. Referring FIG. 8, item names and examples of values that form one record in the job information memory unit 212 are indicated. Referring to FIG. 8, each record of the job information memory unit 212 includes items such as a time and date, a document identification data (ID), a user name, a job name, a storage destination ID, a storage destination path name, a language, a page number, aside setup, and a circulation.

The time and date is when the job information was stored. The document ID is identification information for each piece of the job information. The user name is of the user who conducts the print instruction. The user name is a value input through the setup screen 510 (FIG. 5). The job name is of the document data that is the print object. The storage destination ID is identification information for the storage destination of the print data and is link information for the record of the storage destination information memory unit 213 described below. The storage destination path name is a path name of a folder in which a file storing the print data are disposed. The language is a kind of Printer Job Language (PJL) used in the print data. The page number is of the print data. The side setup is a setup value indicating whether each page is printed on print paper in simplex printing or duplex printing. The color information is a setup value indicating monochrome printing or color printing. The circulation is the number of print copies.

Among these items, the values of the document ID, the user name, the job name, the storage destination path name, the language, the page number, the side setup, the color information, and the circulation are included in the job information sent from the client terminal 30. However, the value of the document ID may be allocated in response to receiving of the job information. The value of the time and date is stored by the job information receiving unit 21. The value of the storage destination ID is set up on the process at a later stage. In a case where the print data is not received along with the job information (said differently, the storage destination of the print data is the client terminal 30), the storage destination path name may not be included in the job information.

Subsequently, the job information receiving unit 21 determines such that the print data is received along with the job information (step S203). Ina case where the print data is received (YES in step S203), the job information receiving unit 21 causes the print data to be stored into the server data memory unit 211 (step S204). Subsequently, the job information receiving unit 21 causes the path name of the storage destination of the print data in the server data memory unit 211 to be stored as the storage destination path name of the target job record and stores the value into the storage destination ID of the target job record. The value stored as the storage destination ID is the storage destination ID allocated to the print server 20 in the storage destination information memory unit 213.

FIG. 9 illustrates an example of the structure of the storage destination information memory unit. Referring FIG. 9, item names and examples of values that form one record in the storage destination information memory unit 213 are indicated. Referring FIG. 9, each record in the storage destination information memory unit 213 includes a storage destination ID, an IP address, a host name, a port number (https), a kind, and so on.

The storage destination ID is identification information for each storage destination (the print server 20 or the client terminal 30) and also is identification information for each record of the storage destination information memory unit 213. The IP address is the IP address of the storage destination. The name is the host name of the storage destination. The port number is the port number of a port opened for receiving the acquisition request to acquire the print data in the storage destination. The port number (hypertext transfer protocol security, i.e., https) is the port number of a port opened for receiving the acquisition request to acquire the print data in the storage destination using https. The kind is an item indicating whether the storage destination is the print server 20. The value of the kind is 1 or 2. The value of 1 designates the print server 20. The value of 2 designates other than the print server 20 (the client terminal 30 in the embodiment).

In step S205, the record whose value of the kind is 1 is searched in the storage destination information memory unit 213, and the storage destination ID of the record is set as the storage destination ID of the target job record. Because the print server 20 already exists as a candidate of the storage destination of the print data, the record corresponding to the print server 20 is previously stored in the storage destination information memory unit 213.

Meanwhile, in a case where the print data is not yet received (NO in step S203), the job information receiving unit 21 generates a new record (hereinafter, referred to as a "target storage destination record") in a storage destination information memory unit 213 so that the target storage destination record has information related to the sending source of the job information (step S206). Said differently, in a case where the print data is not to be sent, the job information sending unit 34 of the client terminal 30 sends the information required to be stored in the storage destination information memory unit 213 to the print server 20. However, in a case where the record corresponding to the same client terminal 30 is already stored in the storage destination information memory unit 213, a new record may not be generated.

Subsequently, the job information receiving unit 21 sets the storage destination ID of the target storage destination record as the destination ID of the target job record (step S207).

Thereafter, the user who conducts the print instruction moves to an installation location of the image forming apparatus 10 at an arbitrary timing and operates the image forming apparatus 10.

Figure 10:
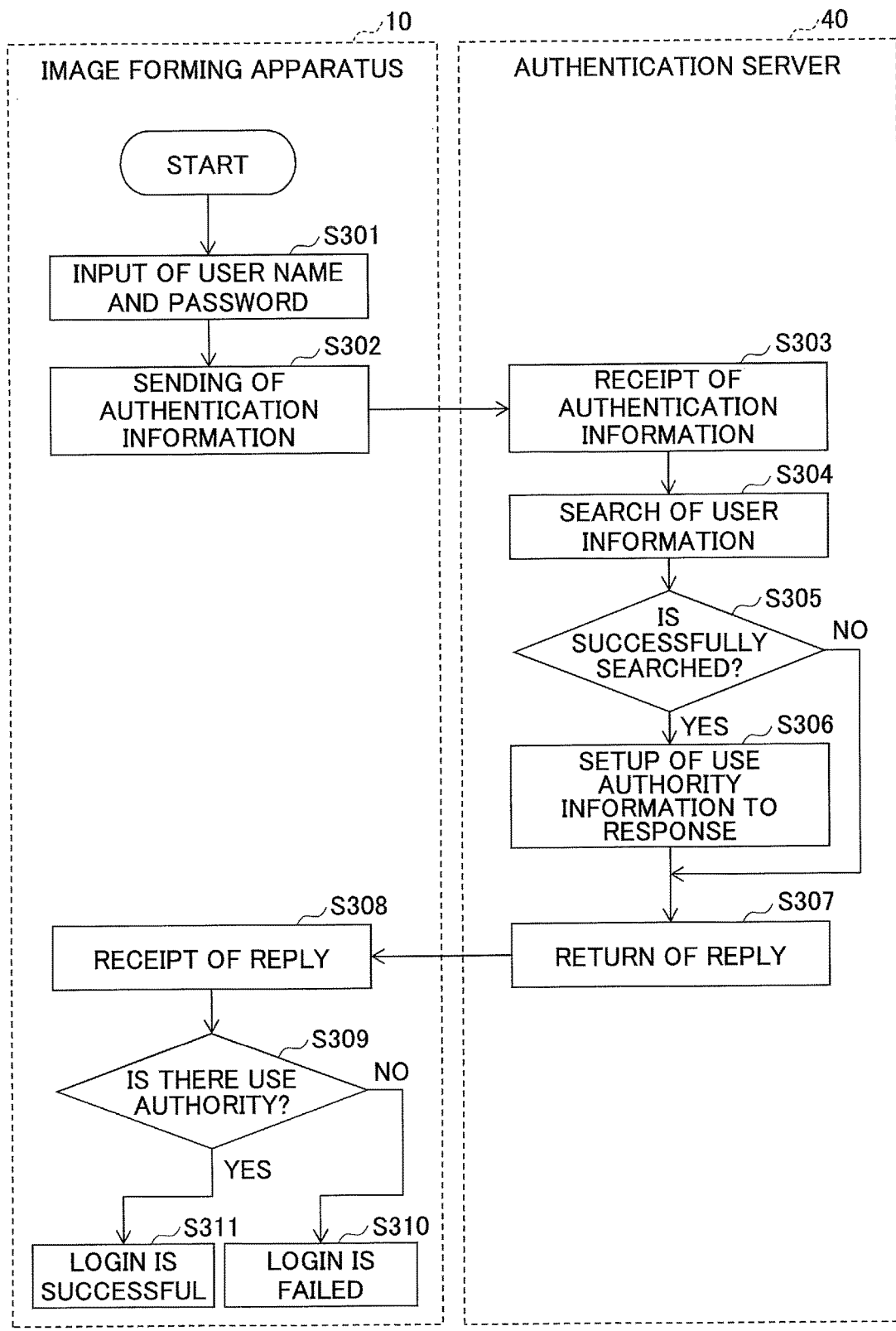
FIG. 10 is a flowchart illustrating an example of a procedure executed by an image forming apparatus when a user logs in the first embodiment of the present invention.

FIG. 10 is a flowchart illustrating an example of a procedure executed by the image forming apparatus when a user logs in in the first embodiment of the present invention.

In step S301, the input control unit 121 receives an input of the user name and password (hereinafter, referred to as "authentication information") through a login screen displayed on the operation panel 15 of the image forming apparatus 10 from the user. Subsequently, the login control unit 123 sends the authentication information to the authentication server 40 (step S302). Here, instead of the inputs of the login name and the user name, an integrated circuit (IC) card may be brought closer to the image forming apparatus 10. Then, it is sufficient that the authentication information is read from the IC card (the content of the authentication information may not be the user name and the password).

When the authentication server 40 receives the authentication information (step S303), the authentication server 40 tries to search a database storing the records including user names, passwords, and use authority information (hereinafter, referred to as "user information") of the image forming apparatus 10 with respect to each rightful user for the user information including the authentication information (step S304). The database may be, for example, an active directory. The use authority information is information indicating whether the use authority exists for each application or for each function of the image forming apparatus 10.

In a case where the corresponding user information is successfully searched for (YES in step S305), the authentication server 40 sets the use authority information included in the user information as the response (step S306). Meanwhile, in a case where the corresponding user information is not successfully searched for (NO in step S305), the use authority information is not set as the response. Subsequently, the authentication server 40 returns a response to the image forming apparatus 10 (step S307).

When the login control unit 123 of the image forming apparatus 10 receives the response from the authentication server 40 (step S308), the login control unit 123 determines whether the response includes the use authority information (step S309). In a case where the response does not include the use authority information (NO in step S309), the login control unit 123 determines that the login is failed, and the login screen is maintained to be displayed (step S310). In a case where the response includes the use authority information (YES in step S309), the login control unit 123 determines that the login is successful, and the display of the login screen is canceled (step S311). As the result, a launcher screen is displayed on the operation panel 15 by the display control unit 122. In a case where the login is successful, the user name input in step S301 is stored in, for example, the RAM 112 as the login user name.

Figure 11:
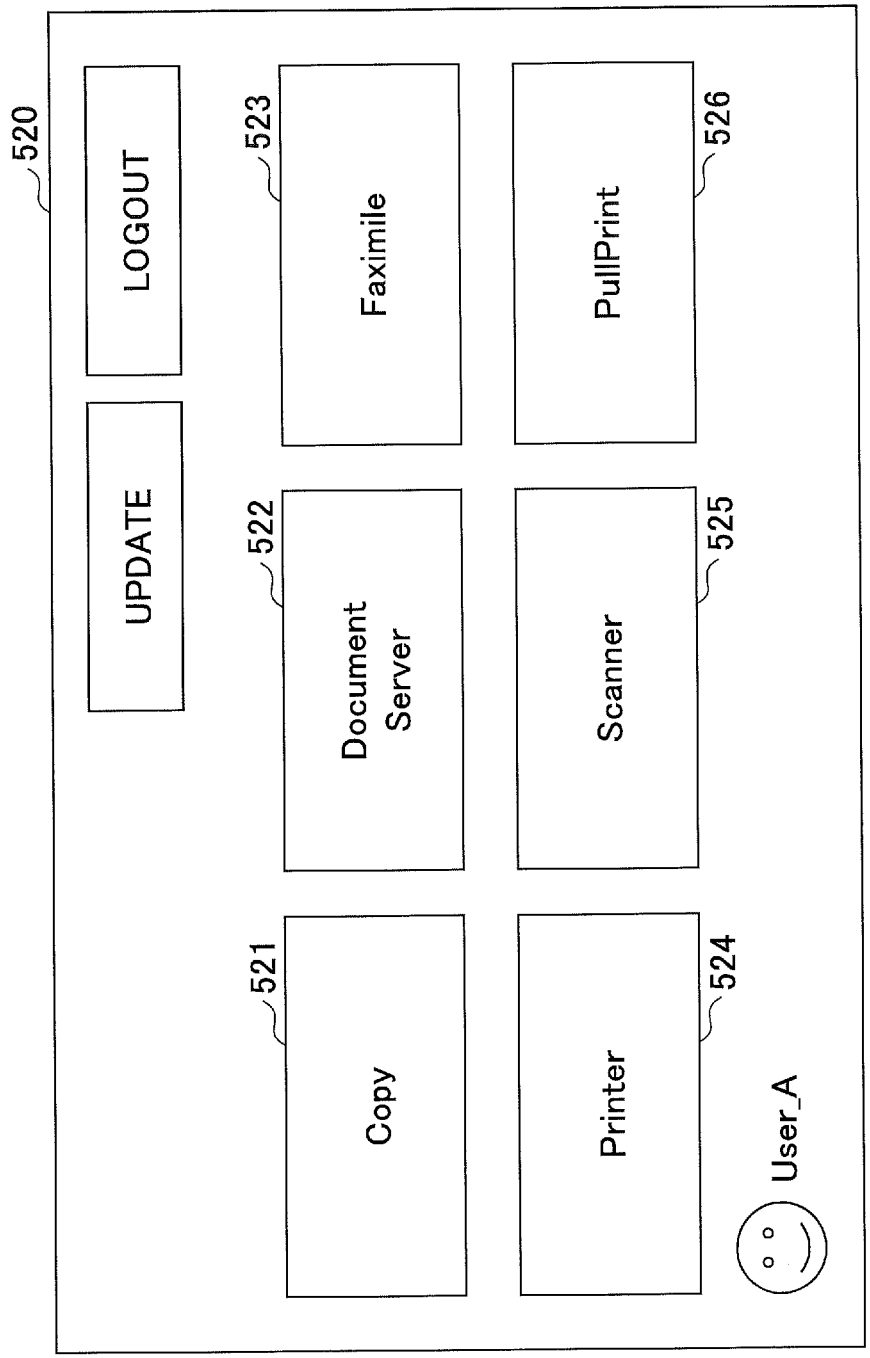
FIG. 11 is an example of a display of a launcher screen.

FIG. 11 is an example of a display of the launcher screen. As illustrated in FIG. 11, a launcher screen 520 displays icons of the applications, for each of which existence of the use authority is indicated in the use authority information. Referring to FIG. 11, an example in which icons 521 to 526 are displayed is illustrated. Here, when an icon 526 is selected, the procedure illustrated in FIG. 12 is executed.

Figure 12:
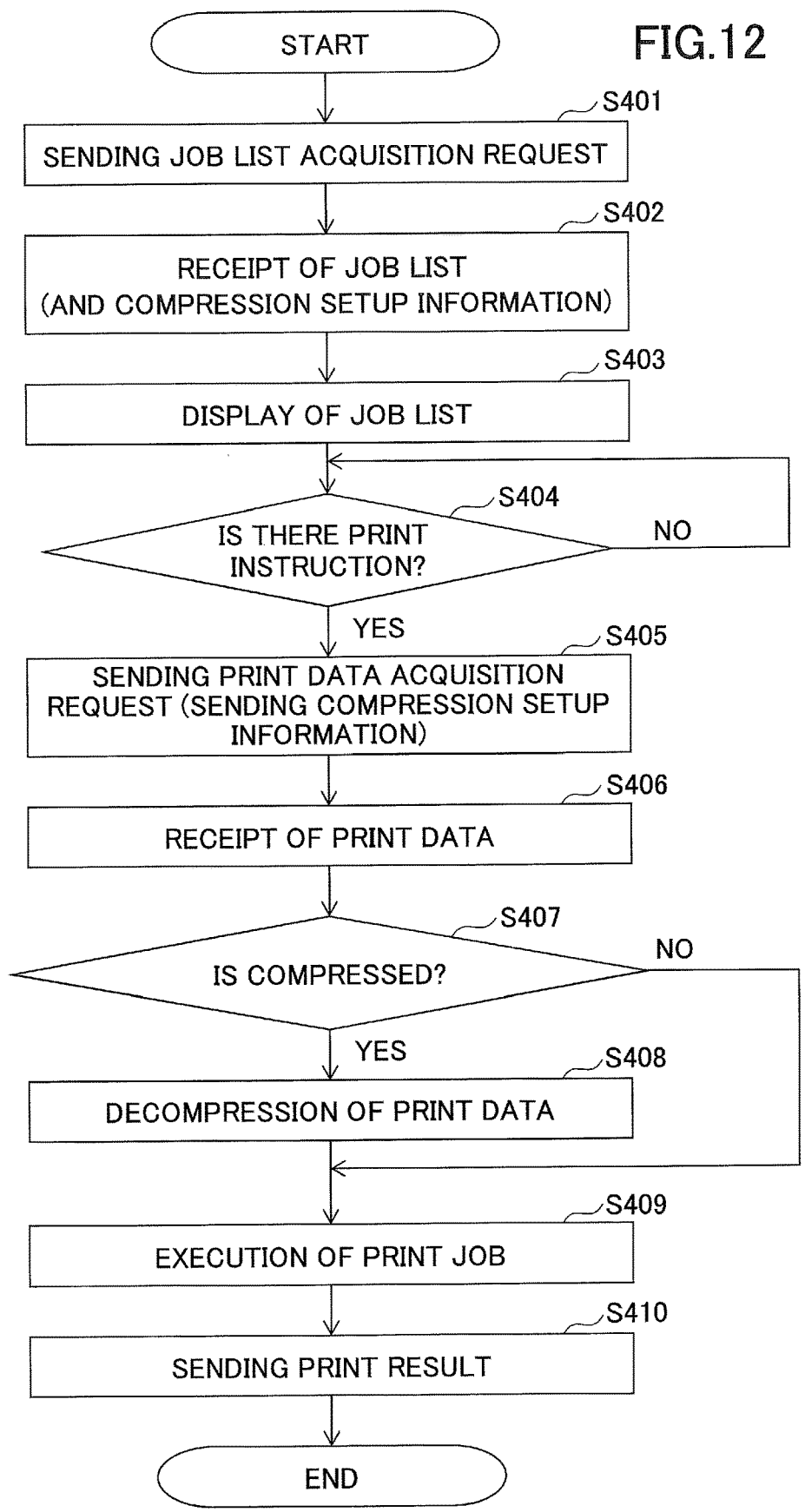
FIG. 12 is a flowchart explaining a procedure executed by the image forming apparatus with regard to the job information stored in the print server in the first embodiment.

FIG. 12 is a flowchart explaining a procedure executed by the image forming apparatus with regard to the job information stored in the print server in the first embodiment.

In step S401, the job list acquisition unit 124 designates a login user name and sends an acquisition request to acquire the job list to the print server 20. In response to the acquisition request, the job list that is formed by the job information including the user name is returned from the print server 20. The job list acquisition unit 124 receives the job list (step S402). In the job information included in the job list, the content of the record of the storage destination information memory unit 213 associated with the storage destination ID of the storage destination information memory unit 213 is added. Further, the compression setup information stored in the compression setup memory unit 214 of the print server 20 is added to each job information included in the job list.

FIG. 13 illustrates an example of a structure of a compression setup memory unit. Referring to FIG. 14, the compression setup memory unit 214 stores the necessity of compression and the compression level. The necessity of compression is an item indicative of the necessity of the compression of the print data. The value of the necessity of compression is True (necessary) or False (unnecessary). The compression level indicates a compression rate whose value range is, for example, an integer from 0 to 10. For example, in gzip, the compression rate can be designated. The range of the value of the compression rate is the range of the value of the compression level. Said differently, the range of the compression level depends on a compression method to be used.

The compression setup information is preset through a compression setup screen as illustrated in FIG. 14, for example.

FIG. 14 is an example of displaying the compression setup screen. Referring to FIG. 14, necessity of compression and compression level can be set on the compression setup screen 560. The compression setup reception unit 24 stores the input compression setup information input through the compression setup screen 560 in the compression setup memory unit 214. Here, the compression setup screen 560 may be displayed on a display apparatus connected to the print server 20, or may be displayed on a terminal connected to the print server 20 via a network.

Subsequently, the display control unit 122 of the image forming apparatus 10 displays the job list display screen including the received job list on the operation panel 15 of the image forming apparatus 10 (step S403).

Figure 15:
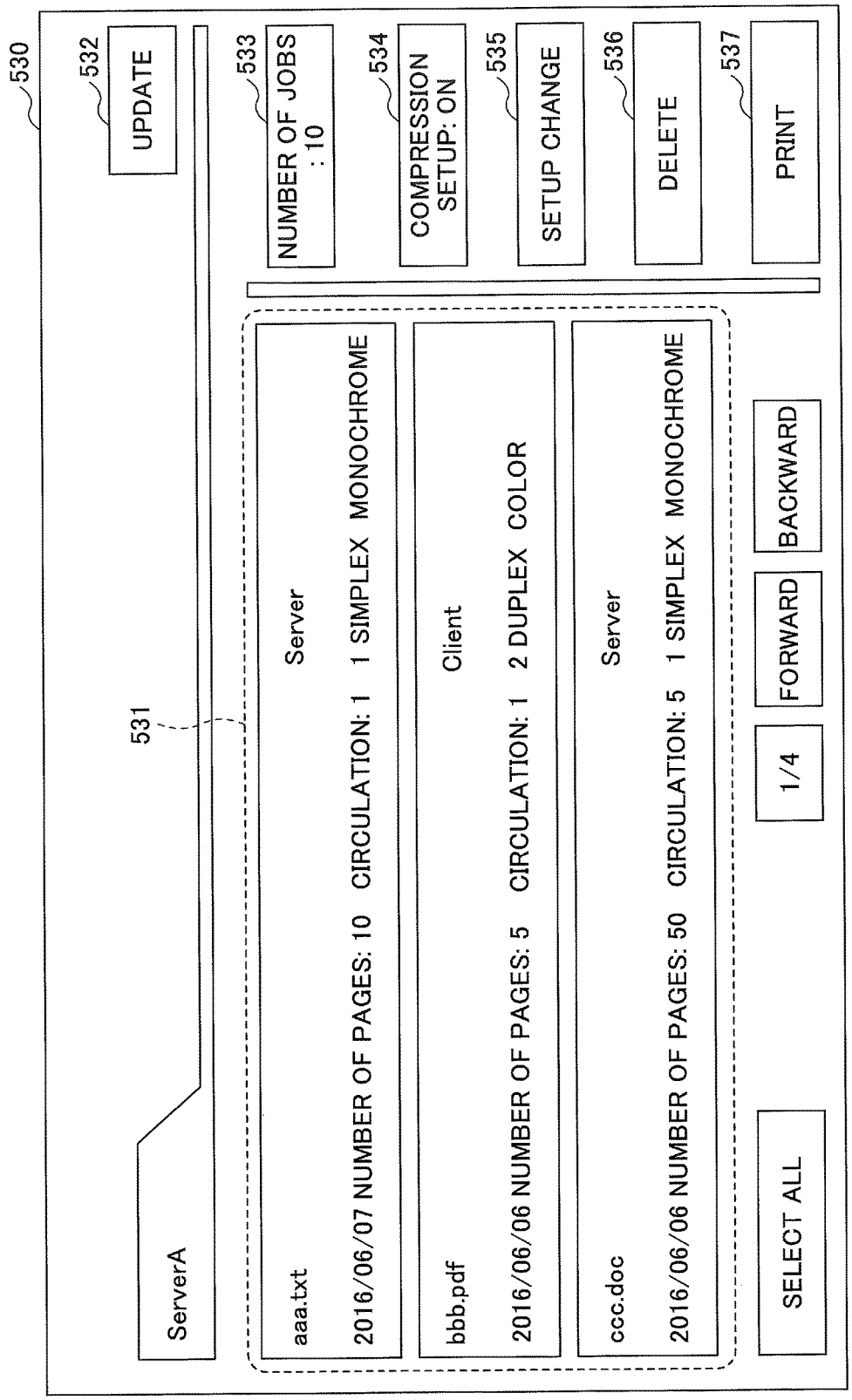
FIG. 15 is an example of displaying a job list display screen.

FIG. 15 is an example of displaying the job list display screen. Referring to FIG. 15, the job list display screen 530 includes a list area 531, an update button 532, a label 533 of the number of jobs, a compression setup button 534, a setup change button 535, a deletion button 536, a print button 537, and so on.

A button (hereinafter, referred to as a "job button") corresponding to each job information included in the job list is displayed in the list area 531. Each job button has a display of a value of a part of the items forming the job information. Referring to FIG. 15, displayed is a kind of the storage destination in addition to a time and date, a page number, a circulation, a side setup, and color information. The kind of the storage destination is converted into a character string such as "Server" and "Client".

The update button 532 is provided to receive an execution instruction for acquiring the job list again. The label 533 of the number of jobs displays the number of the job information included in the job list.

The compression setup button 534 is a toggle button for receiving a setup of whether the print data is compressed for the job information selected in the list area 531. Said differently, the compression (on) or the non-compression (off) is switched over at every push of the compression setup button 534.

The deletion button 536 is provided to receive a deletion instruction of deleting the job information selected in the list area 531.

The setup change button 535 is provided to receive a change instruction of changing the print setup in the job information selected in the list area 531. Said differently, when the setup change button 535 is pushed, the display control unit 122 displays the setup change screen on the operation panel 15.

Figure 16:
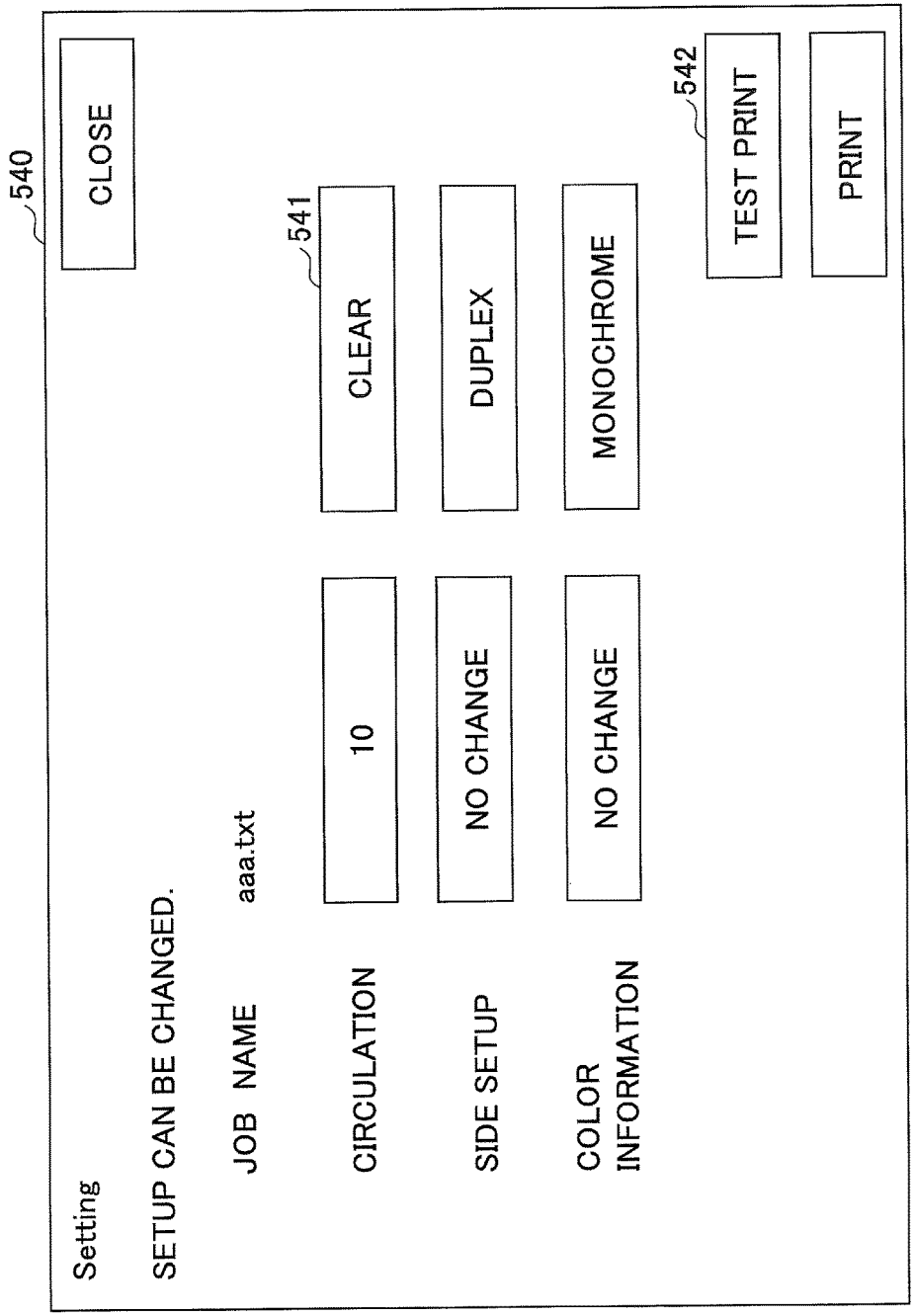
FIG. 16 is an example of displaying a setup change screen.

FIG. 16 is an example of displaying the setup change screen. On the setup change screen 540 illustrated in FIG. 16, an example where setup changes to the circulation, the side setup, and the color information are enabled is displayed. The change on the setup change screen 540 is reflected on the target job information. A clear button 541 related to the circulation is provided to return the value of the circulation to an initial value (the value before the change).

The setup change screen 540 includes a test print button 542. When the test print button 542 is pushed, only one circulation is printed like a test.

Referring back to FIG. 15, the print button 537 is provided to receive the print instruction for the job information selected in the list area 531.

When at least job information is selected by the user through the job list display screen 530 and the print button 537 is pushed, an execution instruction is input (YES in step S404). Then, the data acquisition unit 125 of the image forming apparatus 10 sends the acquisition request to acquire the print data to the IP address and the port number, which are related to the storage destination ID included in the selected job information (step S405). The acquisition request includes a storage destination path name, a job name, and compression setup information added to the job information for each job information selected as the print object. Meanwhile, as to the job information subjected to designation of the necessity of the compression by operating the compression setup button 534, the content of the compression setup information added to the job information is overwritten by the designation. Specifically, the necessity of compression of the compression setup information added to the job information, in which "ON" is selected by the compression setup button 534, is changed to True. The necessity of compression of the compression setup information added to the job information, in which "OFF" is selected by the compression setup button 534, is changed to False.

The acquisition request is received by the server data administering unit 25 of the print server 20 or the client data administering unit 35 of the client terminal 30. The storage destination of the print data may probably differ for each job information. Therefore, it is probable that the acquisition requests to acquire different print data are respectively sent to the server data administering unit 25 and the client terminal 30.

The server data administering unit 25 or the client data administering unit 35 returns the print data specified by the storage destination path name and the job name, which are included in the acquisition request. At this time, in a case where the storage destination of the print data is the print server 20, there is a possibility that compressed print data may be returned. The data acquisition unit 125 receives the returned print data (step S406).

Subsequently, the decompressing unit 126 determines whether the received print data has been compressed or not (step S407). Whether the received print data has been compressed or not may be determined based on the file name of the print data. In a case where the print data is compressed (YES in step S407), the decompressing unit 126 decompresses the print data (step S408). Subsequently, the job executing unit 127 causes the image forming apparatus 10 to execute a print job related to the decompressed print data (step S409). However, in a case where the received print data is not compressed (NO in step S407, the print job related to the print data is executed. While the print job is executed, the display control unit 122 may display a job executing screen as illustrated in FIG. 17 on the operation panel 15.

Figure 17:
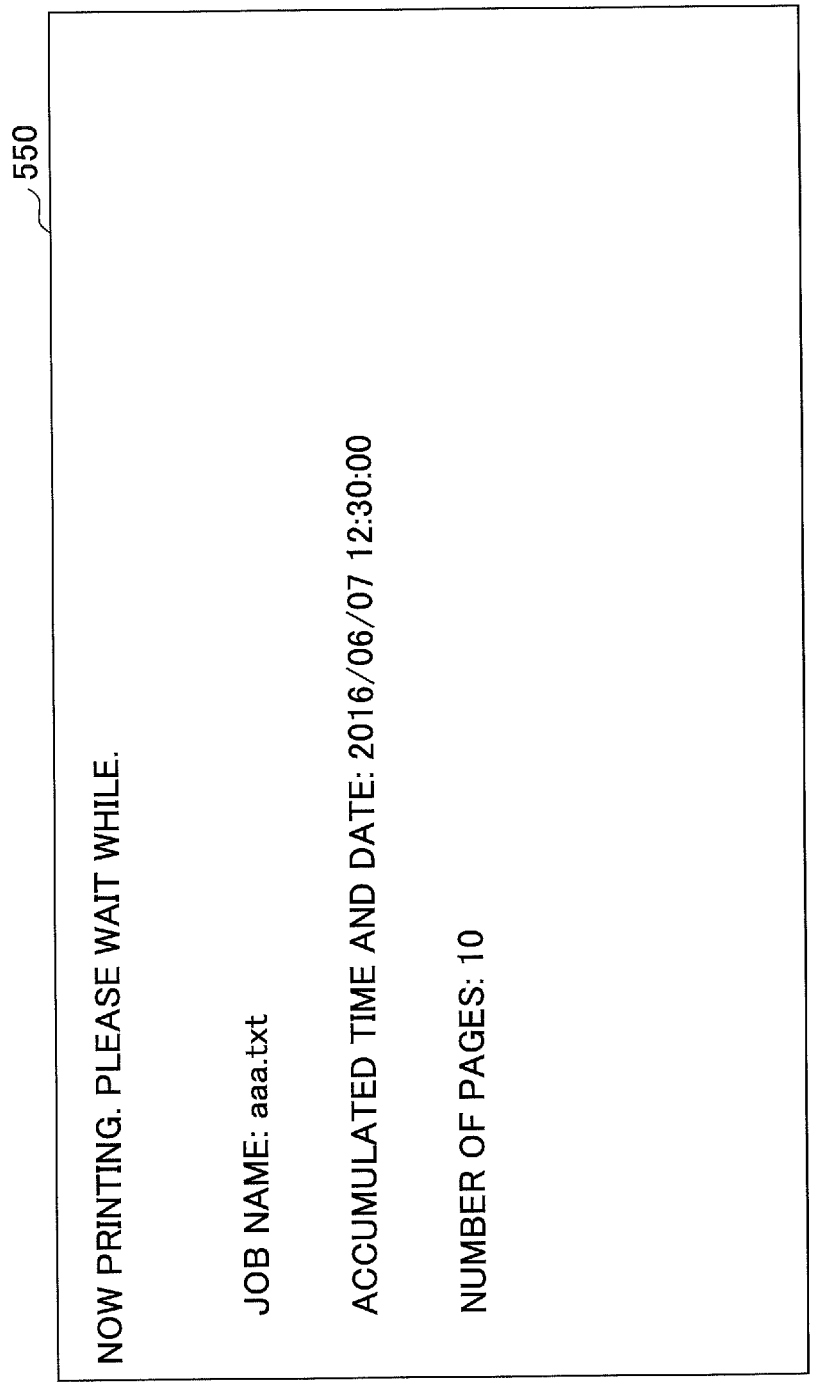
FIG. 17 illustrates an example of displaying a job executing screen.

FIG. 17 is an example of displaying the job executing screen. As illustrated in FIG. 17, the job name, the time and date, the page number, and so on related to the print data during the execution of the print job are displayed on the job executing screen 550. The user can check the state of the print job with reference to the job executing screen 550.

The job executing unit 127 sends an execution result of the completed print job to the acquisition destination (i.e., the storage destination of the print data related to the print job) of the print data at every completion of the print job of the print data (step S410). The execution result includes a document ID of the job information being the print job target and information indicating the success or failure of the print job.

Figure 18:
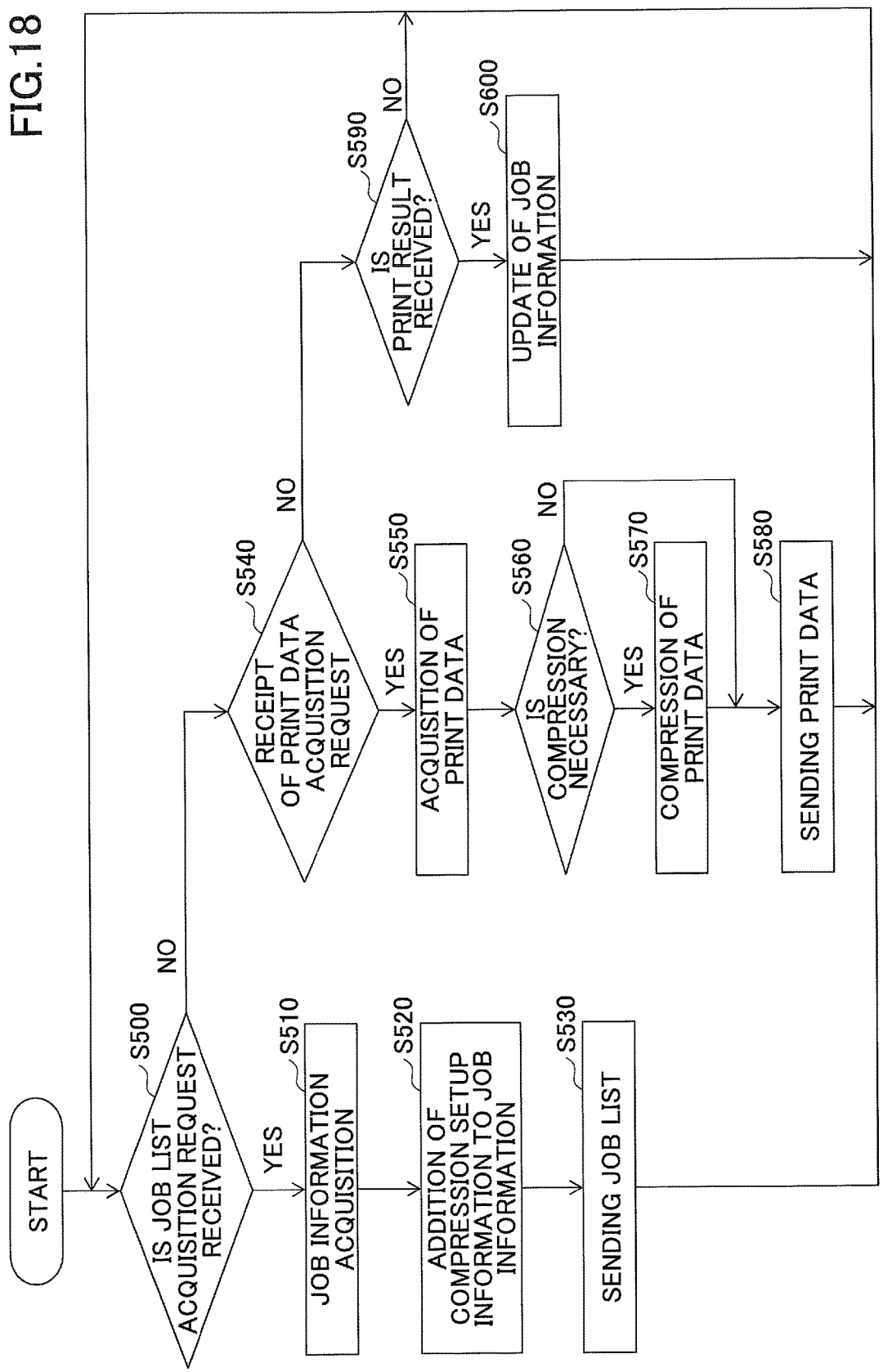
FIG. 18 is a flowchart explaining an example of a procedure executed by the print server with regard to the job information stored in the print server in the first embodiment.

FIG. 18 is a flowchart explaining an example of a procedure executed by the print server with regard to the job information stored in the print server in the first embodiment.

The job list request receiving unit 22 receives the acquisition request to acquire the job list sent in step S401 in FIG. 12 (YES in step S500). Then, the job list returning unit 23 acquires the job information including the user name designated in the acquisition request from the job information memory unit 212 (step S510). Subsequently, the job list returning unit 23 adds the compression setup information stored in the compression setup memory unit 23 (FIG. 13) to the job information for each of the acquired job information (step S520). Said differently, the shared compression setup information is added to each of the job information.

Subsequently, the job list returning unit 23 sends the job list formed by the job information, to which compression setup information is added, to the image forming apparatus 10 (step S530).

Meanwhile, the server data administering unit 25 receives the acquisition request to acquire the print data sent in step S405 of FIG. 12 (YES in step S540). Then, the server data administering unit 25 acquires, from the server data memory unit 211, the storage destination path name that is included in each print data being the acquisition target and each print data specified by the job name (step S550).

Subsequently, the server data administering unit 25 determines whether the print data, for which the compression setup information having the value of the necessity of compression being True in the acquisition request, exists or not (step S560). In a case where the corresponding print data exists (YES in step S560), the server data administering unit 25 compresses the corresponding print data at a compression rate corresponding to the compression level (step S570). As a result, the compression data of the print data is generated. Here, the non-corresponding print data is not subjected to the compression. Subsequently, the server data administering unit 25 sends the print data to the image forming apparatus 10, which is the sending source of the acquisition request. The compressed print data is sent as a compression data.

The server data administering unit 25 receives the execution result of the print job sent in step S410 of FIG. 12 (YES in step S590). The server data administering unit 25 updates the job information including the document ID included in the execution result from among the job information stored in the job information memory unit 212 (step S600). For example, flag information indicating that the print job has been executed is added to this job information. In step S510, the job information including the added flag information may be excluded from the acquisition target.

The client data administering unit 35 of the client terminal 30 executes a procedure similar to steps S540 to S600. Here, within the first embodiment, the client terminal 30 does not include the job information memory unit 212. Therefore, in step S600, the client data administering unit 35 transfers the received execution result to the print server 20.

As described above, within the first embodiment, the print data corresponding to the job information being the print object in the image forming apparatus 10 are compressed and are sent to the image forming apparatus 10. Accordingly, the network load, which is caused by the transfer of the print data stored as the output target to the image forming apparatus 10, can be decreased.

Next, a second embodiment is described. Differences of the second embodiment from the first embodiment are described below. Features of the second embodiment, which are not specifically described, are substantially the same as those of the first embodiment.

Within the second embodiment, the setup receiving unit 31 of a part (hereinafter, referred to as a "client terminal 30a") of the client terminals 30 in the print system 1 can display the compression setup screen 560 illustrated in FIG. 14 on a display apparatus of the client terminal 30a and can receive an input of the compression setup information. The setup memory unit 31 stores the input compression setup information in the setup memory unit 301. The structure of the compression setup information is as illustrated in FIG. 13. Within the second embodiment, the client terminal 30 having the same function as the function of the first embodiment is referred to as a "client terminal 30b".

Figure 19:
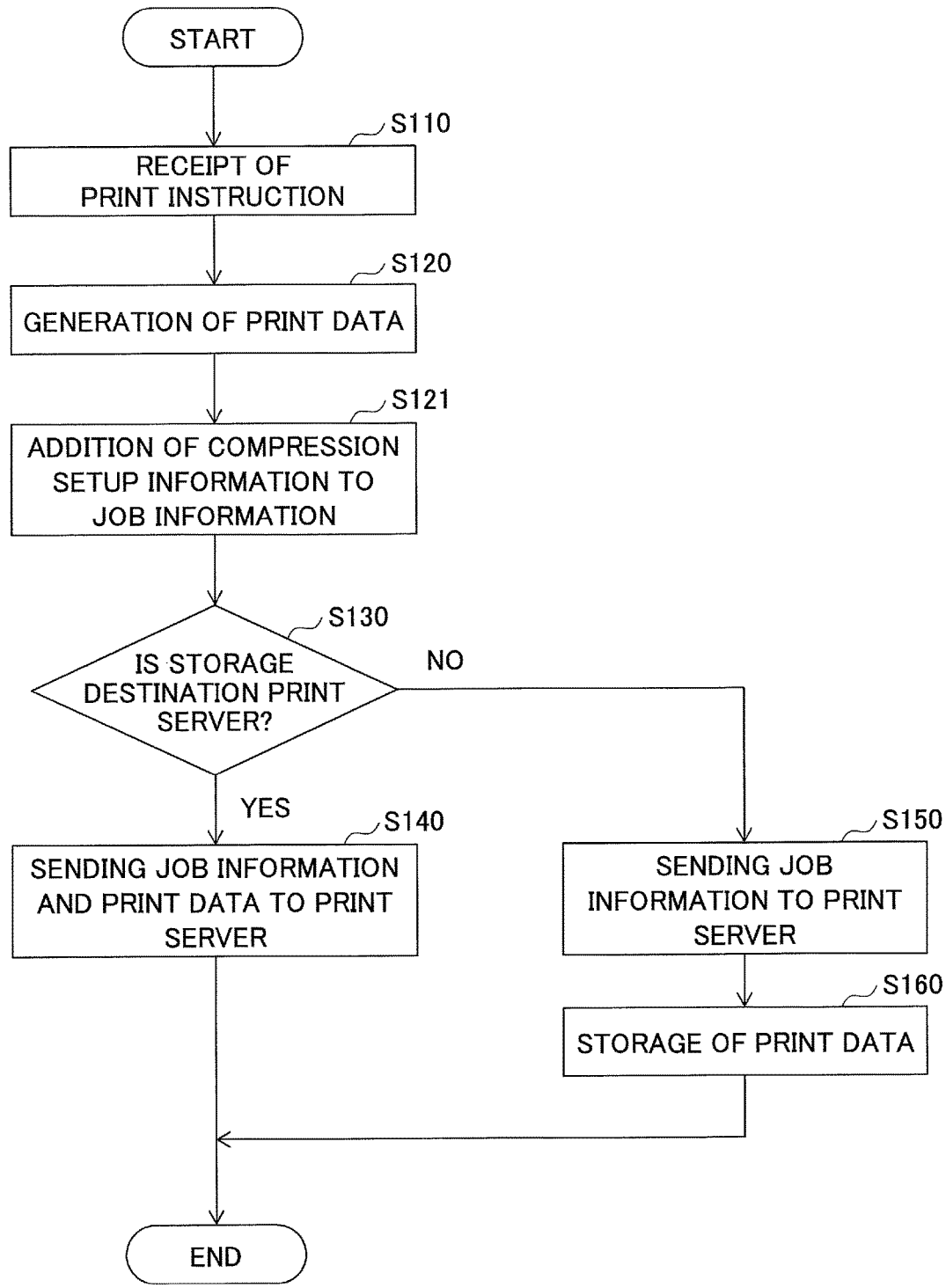
FIG. 19 is a flowchart illustrating an example of a procedure executed by the client terminal in response to a print instruction in a second embodiment.

FIG. 19 is a flowchart illustrating an example of a procedure executed by the client terminal in response to a print instruction in the second embodiment. Referring to FIG. 19, the same reference symbols as those in FIG. 6 are given to the corresponding steps, and explanation of these steps is omitted. The procedure illustrated in FIG. 19 is conducted by the client terminal 30a.

Referring to FIG. 19, step S121 is executed in succession to step S120. In step S121, the print data generating unit 33 of the client terminal 30a adds the compression setup information stored in the setup memory unit 301 to the job information generated in step S120. The processes on and after the step S268 are as described in FIG. 6.

As described, within the second embodiment, the job information sent from the part of the client terminals 30a includes the compression setup information set by the client terminal 30a.

Figure 20:
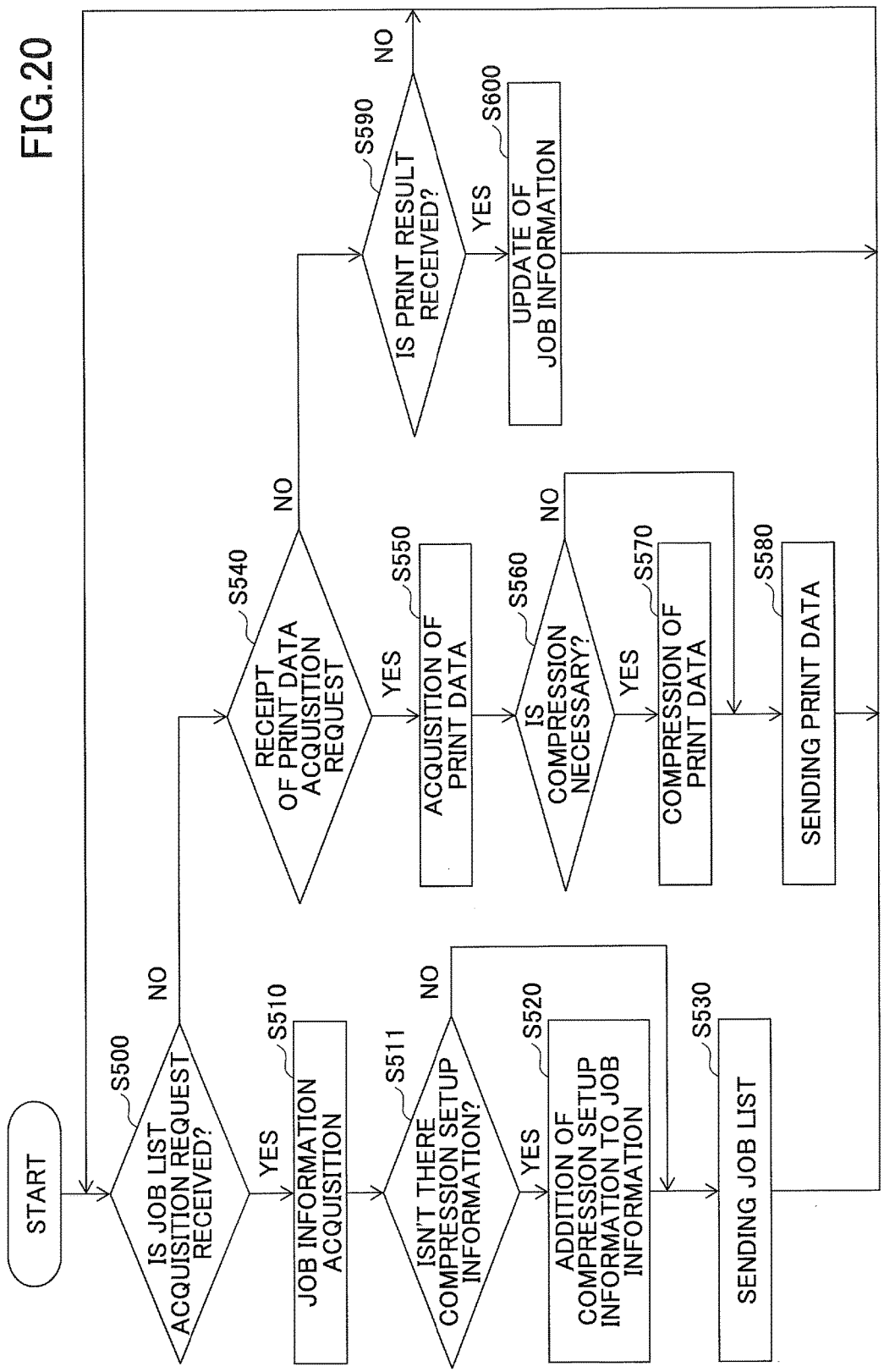
FIG. 20 is a flowchart explaining an example of a procedure executed by the print server with regard to the job information stored in the print server in the second embodiment.

FIG. 20 is a flowchart explaining an example of a procedure executed by the print server with regard to the job information stored in the print server in the second embodiment. Referring to FIG. 20, the same reference symbols as those in FIG. 18 are given to the corresponding steps, and explanation of these steps is omitted.

Referring to FIG. 20, step S511 is executed in succession to step S510. In step S511, the job list returning unit 23 determines whether the compression setup information exists or not for each of the acquired job information (step S511).

With respect to the job information which does not include the compression setup information (YES in step S511), the job list returning unit 23 adds the compression setup information 23 stored in the compression setup memory unit 214 of the print server 20 (step S520). Meanwhile, step S520 is not processed for the job information including the compression setup information (NO in step S511).

Said differently, the compression setup information is included in the job information sent from the client terminal 30a, and the compression setup information is not included in the job information sent from the client terminal 30b. As described, within the second embodiment, the job information sent from the client terminal 30a is applied in priority to the compression setup information set by the client terminal 30a. Meanwhile, regarding the job information sent from the client terminal, the compression setup information set in the print server 20 is applied.

As described, within the second embodiment, the print system 1 can be appropriately operated in an environment where the client terminal 30 of adding the compression setup information to the job information and the client terminal other than the client terminal 30 exist. An example of this environment is that the version of a program installed on the client terminal 30a differs from the version of a program installed on the client terminal 30b.

A third embodiment is described next. Differences of the third embodiment from the first or second embodiment are described. Features of the third embodiment, which are not specifically described, are substantially the same as those of the first or second embodiment.

Within the third embodiment, the server data administering unit 25 or the client data administering unit 35 sets a password to the compressed print data. The password to be set may be a character string previously set as a value of one item of the compression setup information. Said differently, within the third embodiment, the compression setup information may include the password.

Alternatively, the password may be input along with the input of the print instruction in the client terminal 30. In this case, the password may be added to the job information.

The decompressing unit 126 of the image forming apparatus 10 displays a screen for inputting the password on the operation panel 15 at a time of decompressing the compression data. The decompressing unit 126 decompresses the compression data by applying the password input by the user.

Within the third embodiment, in addition to the effects obtained in the first and second embodiments, a leakage of information from the print data circulating through the network can be prevented.

A fourth embodiment is described next. Within the fourth embodiment, a point different from the above embodiments is described. Features of the fourth embodiment, which are not specifically described, are substantially the same as those of the first to third embodiments.

Within the fourth embodiment, the compression setup information is set to the image forming apparatus 10. The set compression setup information is stored in, for example, the HDD 114. Within the fourth embodiment, the compression setup information may not be set to the print server 20 and the client terminal 30.

The data acquisition unit 125 of the image forming apparatus 10 causes the compression setup information, which is stored in the image forming apparatus 10, to be included in the acquisition request at a time of sending the acquisition request to acquire the print data. As a result, the print data is compressed at a compression level set by the image forming apparatus 10.

A fifth embodiment is described next. Within the fifth embodiment, a point different from the above embodiments is described. Features of the fifth embodiment, which are not specifically described, are substantially the same as those of the first to fourth embodiments.

Within the fifth embodiment, the structure of the compression setup information is different from the structure of the compression setup information of the first to fourth embodiments. The compression setup information of the fifth embodiment includes an item of compression conditions in place of the item of the necessity of compression. Conditions for executing the compression based on an attribute of the print data are set in the compression conditions. For example, the threshold value relative to the data size (the data amount) or the threshold value relative to the page number may be compression conditions. In this case, the print data of the threshold value or greater is the target of the compression, and the other print data is not the target of the compression.

Further, the compression conditions may be set based on the value of the item of the job information corresponding to the print data. For example, the user name may be the compression conditions. In this case, the print data corresponding to the job information including the user name set in the compression conditions is the target of the compression, and the other print data is not the target of the compression.

Instead, a threshold value for the bandwidth of the network used to transfer the print data may be set as the compression conditions. In this case, the estimate value of the bandwidth of the network is less than threshold value, the print data is subjected to the compression, and in the other case, the print data may not be executed. The estimate value of the bandwidth of the network can be calculated using a known technique.

Within the fifth embodiment, the necessity of the compression can be dynamically changed for each print data or the load on the network at a time of executing the print job. In a case where the data size of the print data of the print object is small or in a case where the bandwidth is great, the probability of the compression or the decompression can be lowered and a process load caused by the compression and the decompression can be reduced.

In the above embodiments, the job information may be stored in the client terminal 30 in place of the print server. In this case, the image forming apparatus 10 may acquire the job list from the client terminal 30.

Further, the above embodiments may be applied to the output data from the apparatus other than the image forming apparatus 10 and the output data other than the print data. For example, the projector may be used in place of the image forming apparatus 10. In this case, the data projected (output) by the projector may be used in place of the printer. The above embodiments may be applied to another data output apparatus.

Within the above embodiments, the print server 20 and the client terminal 30 are an example of an information processing apparatus. The image forming apparatus 10 is an example of an apparatus. The server data memory unit 211 and the client data memory unit 302 are an example of a first memory unit. The server data administering unit 25 and the client data administering unit 35 are an example of each of a compression unit and a sending unit. The compression setup memory unit 214 and the setup memory unit 301 is an example of a second memory unit. The job information receiving unit 21 is an example of a receiver.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing apparatus of the present invention has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing apparatus comprising:
   a processor; and
   a first memory configured to store data, which is output target data to be output to an apparatus, and to store program instructions that, when executed by the processor, cause the processor to:
   generate compressed data by compressing the data; and
   send the compressed data, corresponding to the output target data, in response to a data acquisition request to acquire the output target data from the apparatus, wherein
      the compressed data is generated based on an attribute of the output target data that satisfies a threshold bandwidth value of a network connecting the information processing apparatus and the apparatus,
      the attribute of the output target data is at least one of time and date information, document identification information, user identification information, job identification information, storage destination identification information, a storage destination path name, or output copy quantity information,
the threshold bandwidth value of the network relative to one of either a data size of the data or a page count of the data is used to determine whether the data is to be compressed, and
whether the data is to be compressed is dynamically determined in accordance with the threshold bandwidth value of the network relative to the one of the data size of the data or the page count of the data that is used in determining the compression level.

2. The information processing apparatus according to claim 1, the information processing apparatus further comprising:
a second memory configured to store setup information related to compression of the data, and
the execution of the program instructions further cause the processor to:
generate the compressed data in accordance with the setup information stored in the second memory.

3. The information processing apparatus according to claim 2, wherein the execution of the program instructions further cause the processor to:
send view information of the target output data, including the setup information stored in the second memory, in response to an acquisition request to acquire the view information of the target output data from the apparatus, and
generate the compressed data in accordance with information that indicates necessity of compression and that is included in the acquisition request in response to the data acquisition request based on the view information of the output target data from the apparatus.

4. The information processing apparatus according to claim 2, the information processing apparatus further comprising:
a receiver configured to receive the output target data being the output target to the apparatus from a terminal, which is coupled through a network, and causes the data to be stored in the first memory, and
wherein the execution of the program instructions further cause the processor to:
generate the compressed data for the data received by the receiver together with a designation of setup information related to the compression in accordance with the setup information.

5. The information processing apparatus according to claim 1, the information processing apparatus further comprising:
a receiver configured to receive the output target data being the output target to the apparatus from a terminal, which is coupled through a network, and causes the output target data to be stored in the first memory, and
wherein the execution of the program instructions further cause the processor to:
generate the compressed data for the output target data received by the receiver together with a designation of setup information related to the compression in accordance with the setup information.

6. The information processing apparatus according to claim 1, wherein the execution of the program instructions further cause the processor to:
send the compressed data corresponding to the output target data and send the output target data without having the corresponding compressed data.

7. The information processing apparatus according to claim 1,
wherein the compressed data is generated based on the attribute of the output target data that satisfies a predetermined condition and the threshold bandwidth value of the network connecting the information processing apparatus and the apparatus.

8. An information processing system comprising:
an apparatus; and
an information processing apparatus,
wherein the information processing apparatus includes
a first processor, and
a first memory configured to store data, which is output target data to be output to the apparatus, and program instructions that, when executed by the first processor, cause the first processor to:
generate compressed data formed by compressing the data, and
send the compressed data corresponding to the data in response to a data acquisition request to acquire the data from the apparatus,
wherein the apparatus includes
a second processor, and
a second memory configured to store program instructions that, when executed by the second processor, cause the second processor to:
decompress the compressed data received from the information processing apparatus, and
wherein
the compressed data is generated based on an attribute of the output target data that satisfies a threshold bandwidth value of a network connecting the information processing apparatus and the apparatus,
the attribute of the output target data is at least one of time and date information, document identification information, user identification information, job identification information, storage destination identification information, a storage destination path name, or output copy quantity information,
the threshold bandwidth value of the network relative to one of either a data size of the data or a page count of the data is used to determine whether the data is to be compressed, and
whether the data is to be compressed is dynamically determined in accordance with the threshold bandwidth value of the network relative to the one of the data size of the data or the page count of the data that is used in determining the compression level.

9. The information processing system according to claim 8,
wherein the information processing apparatus further includes
a third memory configured to store setup information related to compression of the data, and
wherein the execution of the program instructions further cause the first processor to:
generate the compressed data in accordance with the setup information stored in the third memory.

10. The information processing system according to claim 9, wherein the execution of the program instructions further cause the first processor to:
send view information of the data including the setup information stored in the third memory in response to an acquisition request to acquire the view information of the data from the apparatus, and generate the compressed data in accordance with information that indicates necessity of compression and is included in the acquisition request in response to the data acquisition request based on the view information of the data from the apparatus.

11. The information processing system according to claim 9, wherein the information processing apparatus further includes a receiver configured to receive the output target data being the output target to the apparatus from a terminal, which is coupled through a network, and causes the data to be stored in the first memory, wherein the execution of the program instructions further cause the first processor to:

generate the compressed data for the output target data received by the receiver together with a designation of setup information related to the compression in accordance with the setup information.

12. The information processing system according to claim 8, wherein the information processing apparatus further includes a receiver configured to receive the data being the output target to the apparatus from a terminal, which is coupled through a network, and causes the data to be stored in the first memory, wherein the execution of the program instructions further cause the first processor to:

generate the compressed data for the data received by the receiver together with a designation of setup information related to the compression in accordance with the setup information.

13. The information processing system according to claim 8, wherein the execution of the program instructions further cause the first processor to:

send the compressed data corresponding to the output target data and send the output target data without having the corresponding compressed data.

14. A method for processing information performed by a computer, the method comprising:

storing, by a first memory, data, which is output target data to be output to an apparatus;

generating compressed data formed by compressing the data; and sending the compressed data corresponding to the data in response to a data acquisition request to acquire the data from the apparatus, wherein the compressed data is generated based on an attribute of the output target data that satisfies a threshold bandwidth value of a network connecting the computer and the apparatus, the attribute of the output target data is at least one of time and date information, document identification information, user identification information, job identification information, storage destination identification information, a storage destination path name, or output copy quantity information, the threshold bandwidth value of the network relative to one of either a data size of the data or a page count of the data is used to determine whether the data is to be compressed, and whether the data is to be compressed is dynamically determined in accordance with the threshold bandwidth value of the network relative to the one of the data size of the data or the page count of the data that is used in determining the compression level.

15. The method according to claim 14, the method further comprising:

storing, by a second memory, setup information related to compression of the data, wherein the compressed data is generated in accordance with the setup information stored in the second memory.

16. The method according to claim 15, wherein the execution of the program instructions further cause the first processor to:

send view information of the data, including the setup information stored in the second memory, in response to an acquisition request to acquire the view information of the data from the apparatus, and generate the compressed data in accordance with information that indicates necessity of compression and that is included in the acquisition request in response to the data acquisition request, based on the view information of the data from the apparatus.

17. The method according to claim 15, the method further comprising:

receiving the data being the output target to the apparatus from a terminal which is coupled through a network, and causing the data to be stored in the first memory, wherein the compressed data is generated for the data received by the receiver together with a designation of setup information related to the compression in accordance with the setup information.

18. The method according to claim 14, the information processing apparatus further comprising:

receiving the data being the output target to the apparatus from a terminal, which is coupled through a network, and causing the data to be stored in the first memory, wherein the compressed data is generated for the data received by the receiver together with a designation of setup information related to the compression in accordance with the setup information.

19. The method according to claim 14, wherein the sending sends the compressed data corresponding to the data and sends the data without having the corresponding compressed data.

20. The method for processing information performed by the computer according to claim 14, wherein the compressed data is generated based on the attribute of the output target data that satisfies a predetermined condition and the threshold bandwidth value of the network connecting the computer and the apparatus.

* * * * *